United States Patent [19]

D'Costa et al.

[11] Patent Number: 5,779,241
[45] Date of Patent: Jul. 14, 1998

[54] APPARATUS AND METHOD FOR MEASUREMENT OF POSITION AND VELOCITY

[76] Inventors: Joseph F. D'Costa, 700 10th Ave. SE., #8, Minneapolis, Minn. 55414; Arthur G. Erdman, 1957 3rd St. SW., New Brighton, Minn. 55112; Timothy A. Rodgers, 75 W. Golden Lake Rd., Circle Pines, Minn. 55014

[21] Appl. No.: 460,117

[22] Filed: Jun. 2, 1995

[51] Int. Cl.$^6$ ..................................... A63B 57/00
[52] U.S. Cl. ..................... 273/371; 473/192; 473/194
[58] Field of Search .............................. 273/348, 371, 273/374, 394, 410, 26 A, 55 A, 55 B; 473/190, 191, 192, 194, 197; 463/53

[56] References Cited

U.S. PATENT DOCUMENTS

| | | | |
|---|---|---|---|
| 2,040,228 | 5/1936 | Whiteley | |
| 2,973,964 | 3/1961 | Zito | |
| 4,029,315 | 6/1977 | Bon | 473/439 |
| 4,070,018 | 1/1978 | Hodges | 473/462 |
| 4,199,141 | 4/1980 | Garcia | 473/455 |
| 4,565,366 | 1/1986 | Struss | 482/84 |
| 4,659,090 | 4/1987 | Kustanovich | 473/455 |
| 4,761,005 | 8/1988 | French et al. | 273/454 |
| 4,770,527 | 9/1988 | Park | 473/455 |
| 4,822,042 | 4/1989 | Landsman | 473/463 |
| 4,824,107 | 4/1989 | French | 273/454 |
| 4,883,271 | 11/1989 | French | 273/454 |
| 4,915,384 | 4/1990 | Bear | 473/451 |
| 5,046,729 | 9/1991 | Yancey | 473/455 |
| 5,095,433 | 3/1992 | Botarelli et al. | 273/372 |
| 5,209,483 | 5/1993 | Gedney et al. | 473/223 |

FOREIGN PATENT DOCUMENTS

| | | | |
|---|---|---|---|
| 1498522 | 6/1987 | U.S.S.R. | |

*Primary Examiner*—Jessica Harrison
*Attorney, Agent, or Firm*—Hans I. Sun; Emil Moffa

[57] ABSTRACT

A sensor for locating the position of and measuring the velocity of an impacting object. The sensor employs a net attached at each edge to sensor modules mounted on a frame. Each sensor module includes an output drum, a take up drum, a spring and a motor. The net is attached to the sensor modules by cords wound on a spring loaded output drum. The drum is coaxial with a motor that generates a voltage proportional to the angular velocity of the drum. The diode isolated motor partially dissipates the energy of impact to heat on the return stroke in response to the restorative force of the spring. An object impacting a net draws the cord from the output drum, generating a voltage from an attached motor. A maximum voltage or an integrated voltage generated by the motors determines the velocity of impact. Each particular net has an associated set of axes. A pair of motors, their position known relative to the frame, are placed along these axes attached to one or more strings by a cord. The position of impact is determined by the motors generating the largest voltage. Alternatively, the impact position may be determined by the two pairs of sensors generating the highest voltage, where the sensor pair is connected to the same string. A take up drum and a spring bias the system toward a rest position, returning the object to a predetermined area.

63 Claims, 26 Drawing Sheets

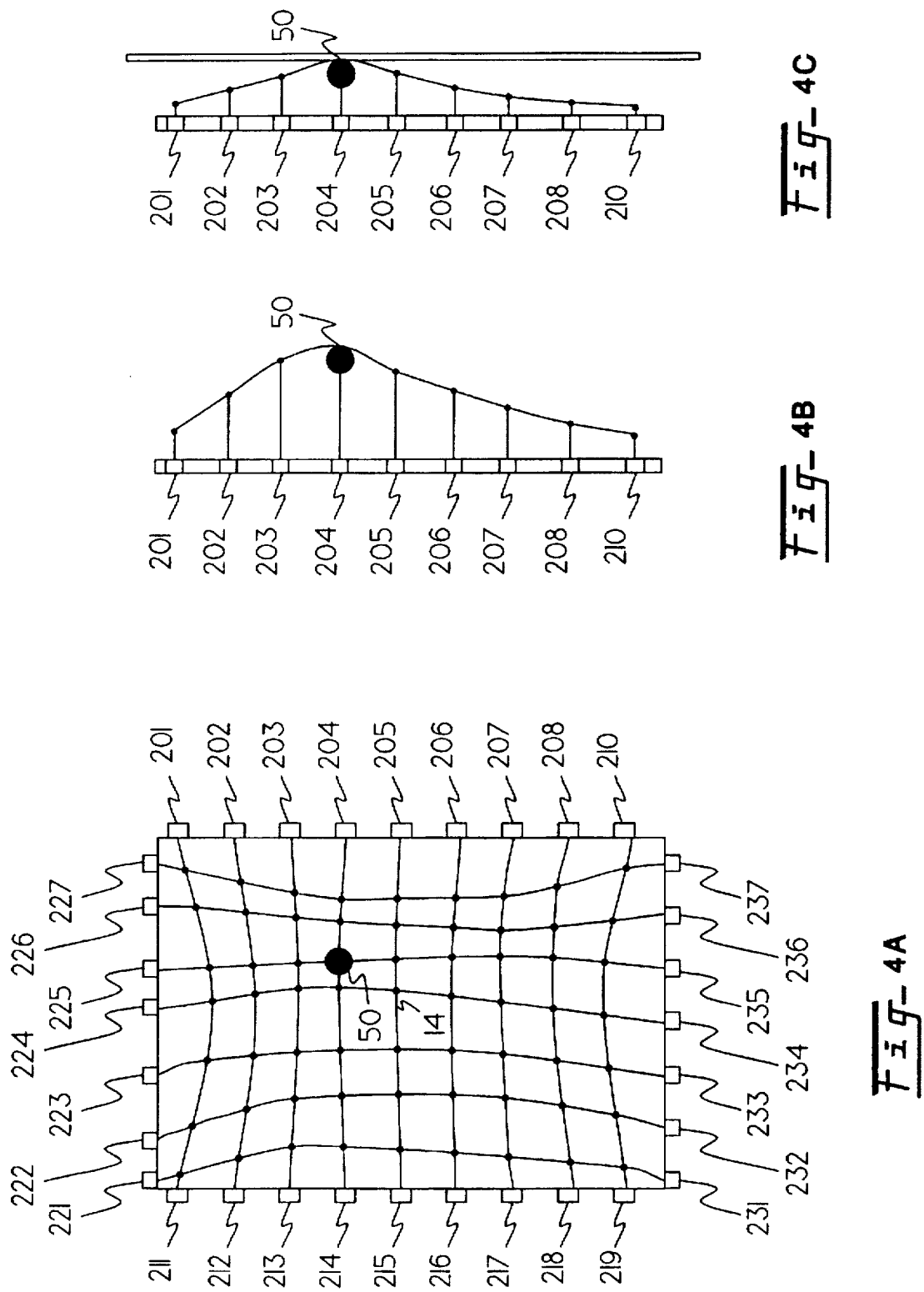

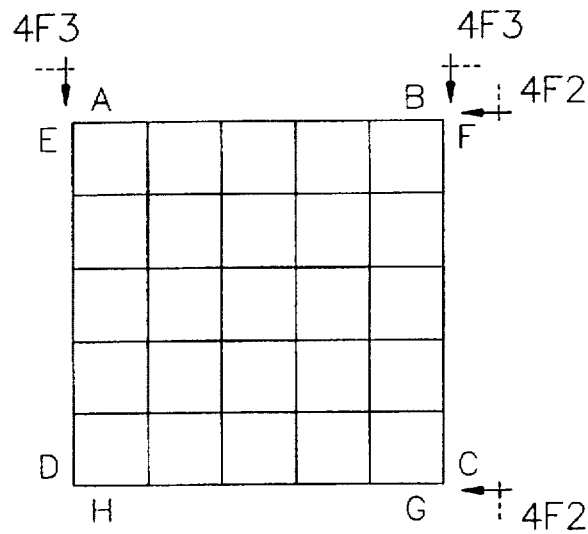
Fig. 4F1
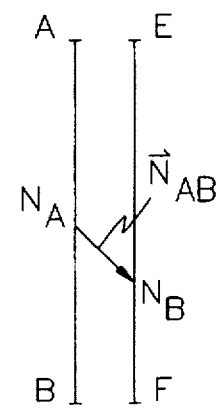
Fig. 4F2    Fig. 4F3
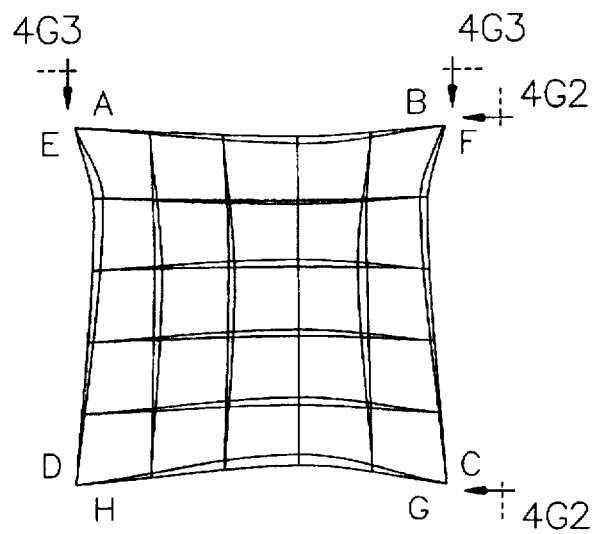
Fig. 4G1
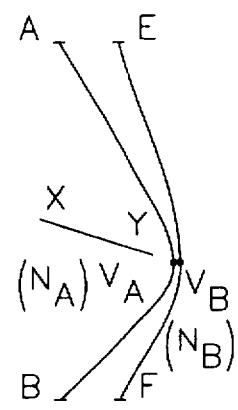
Fig. 4G2    Fig. 4G3

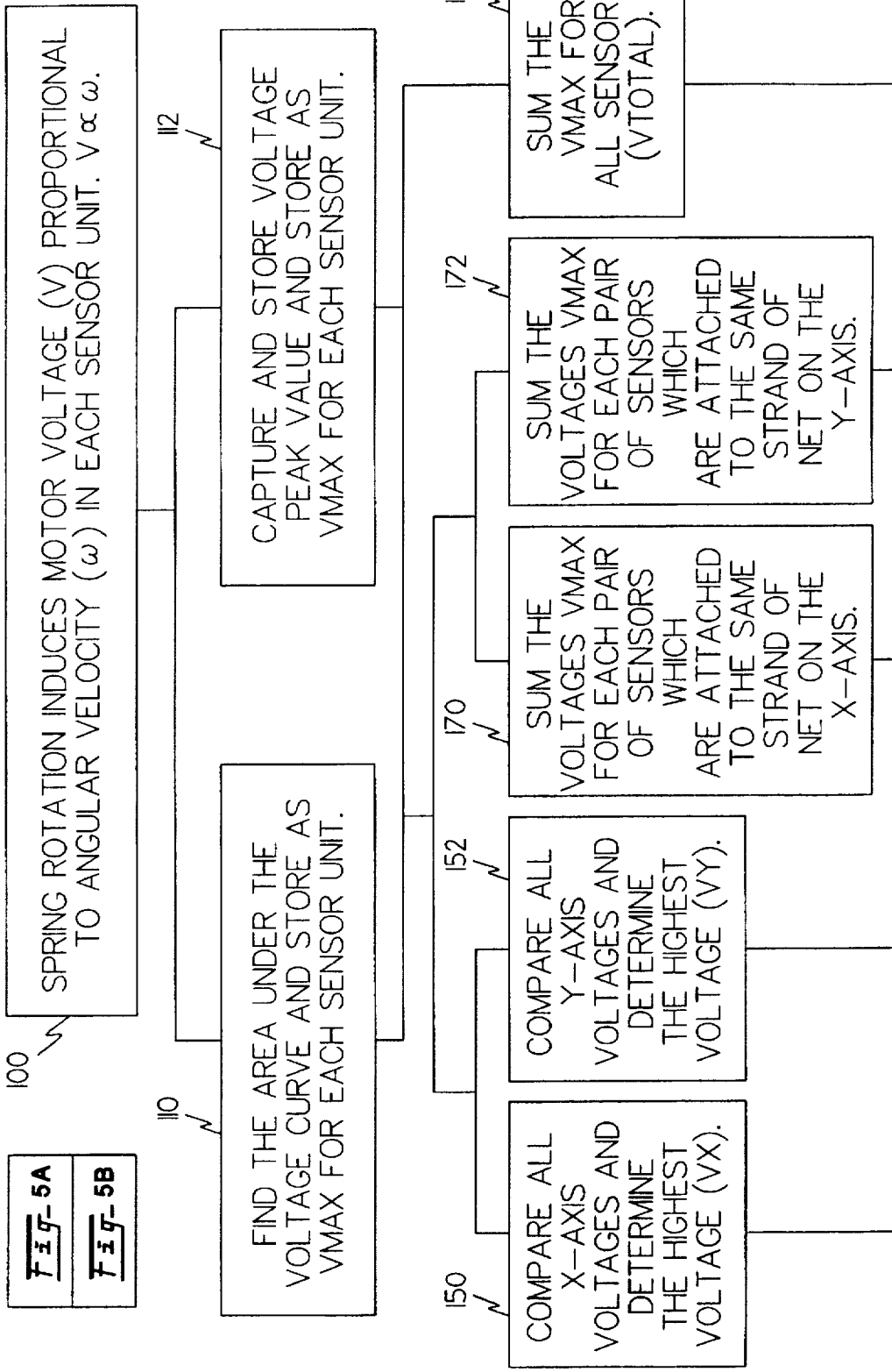

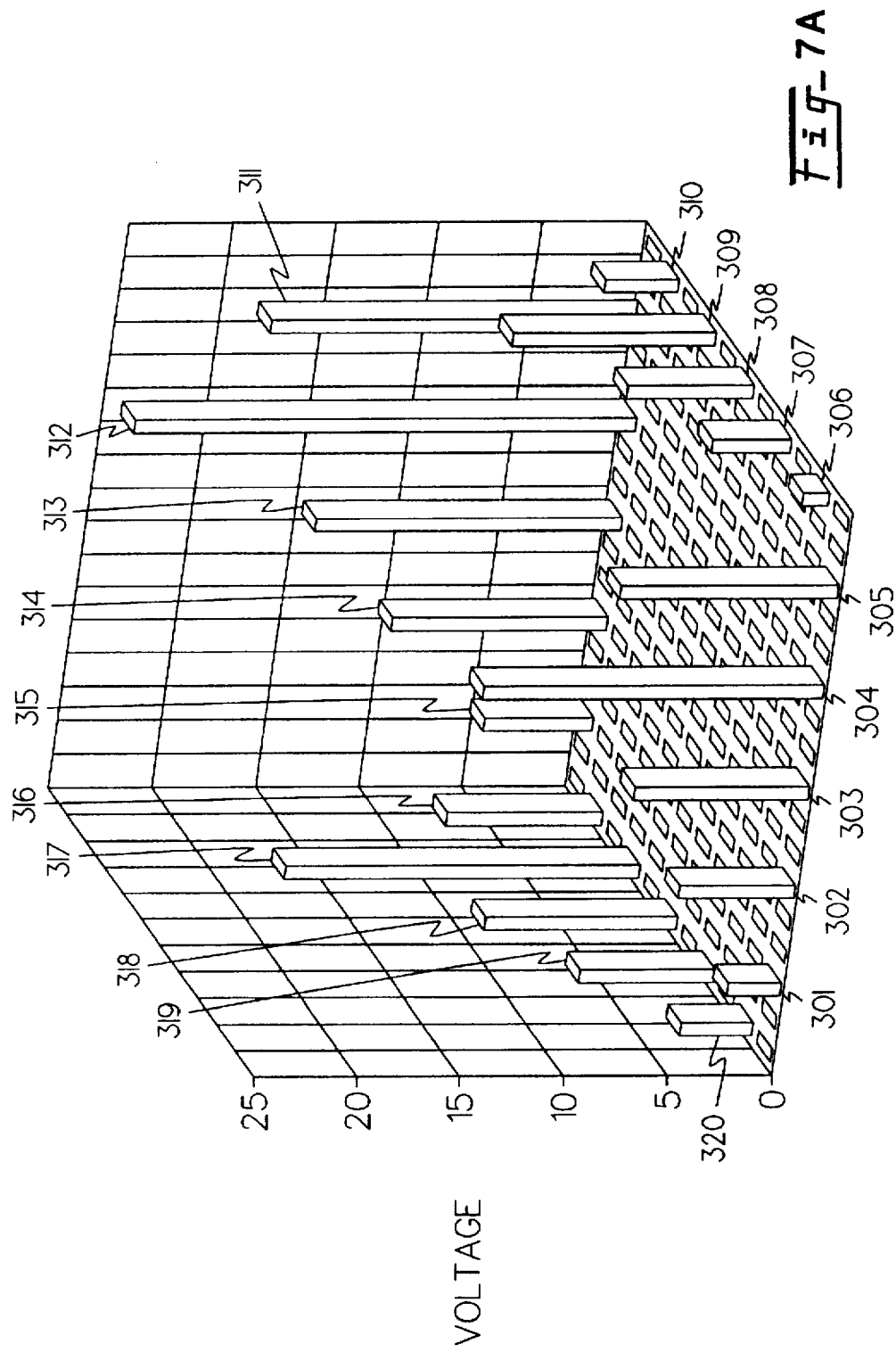

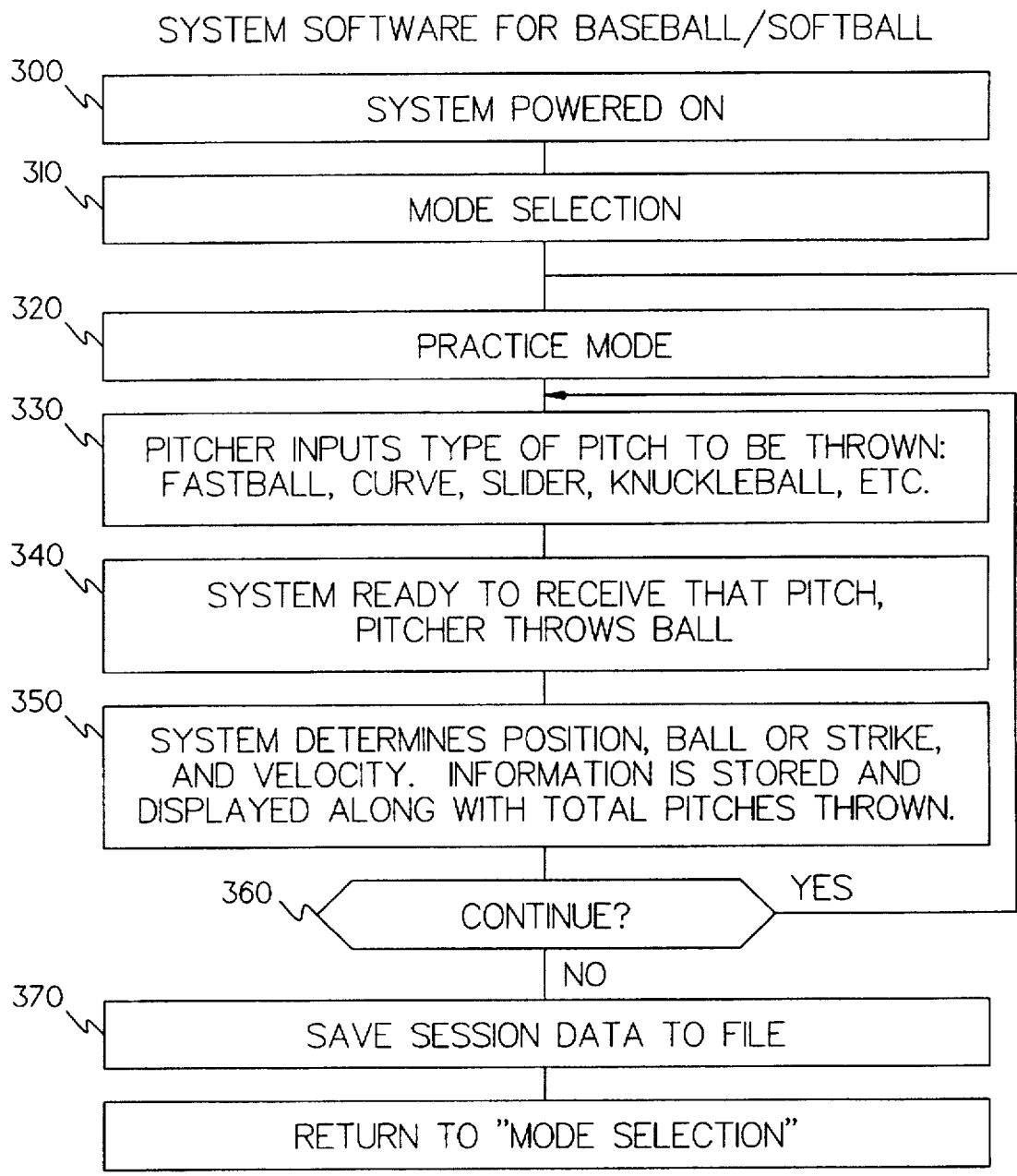

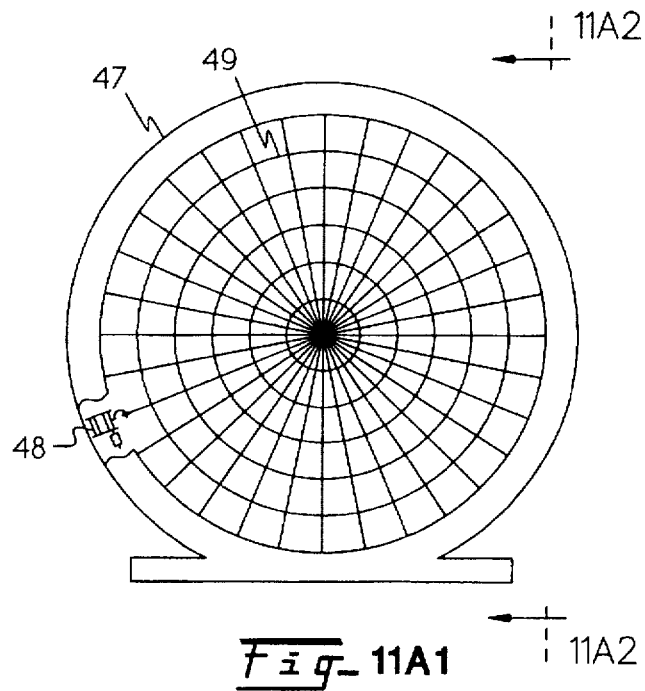
Fig. 11A1
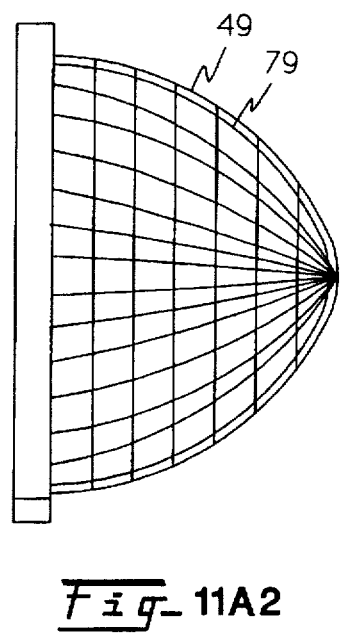
Fig. 11A2
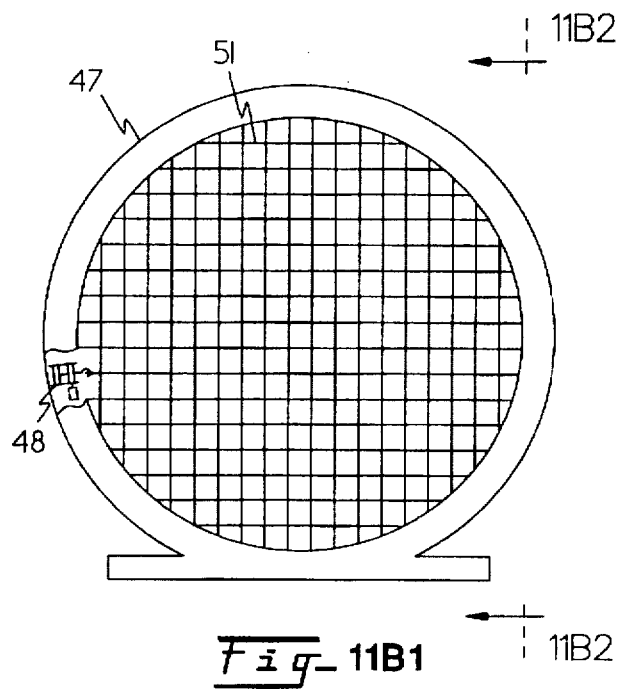
Fig. 11B1
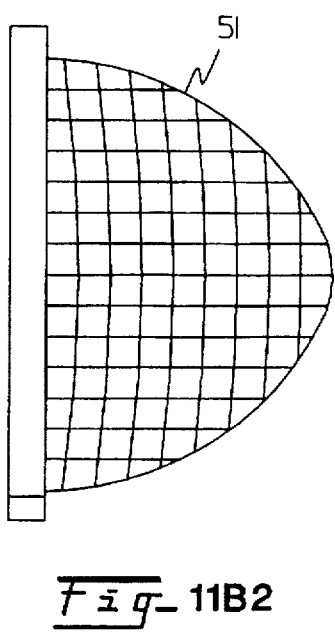
Fig. 11B2

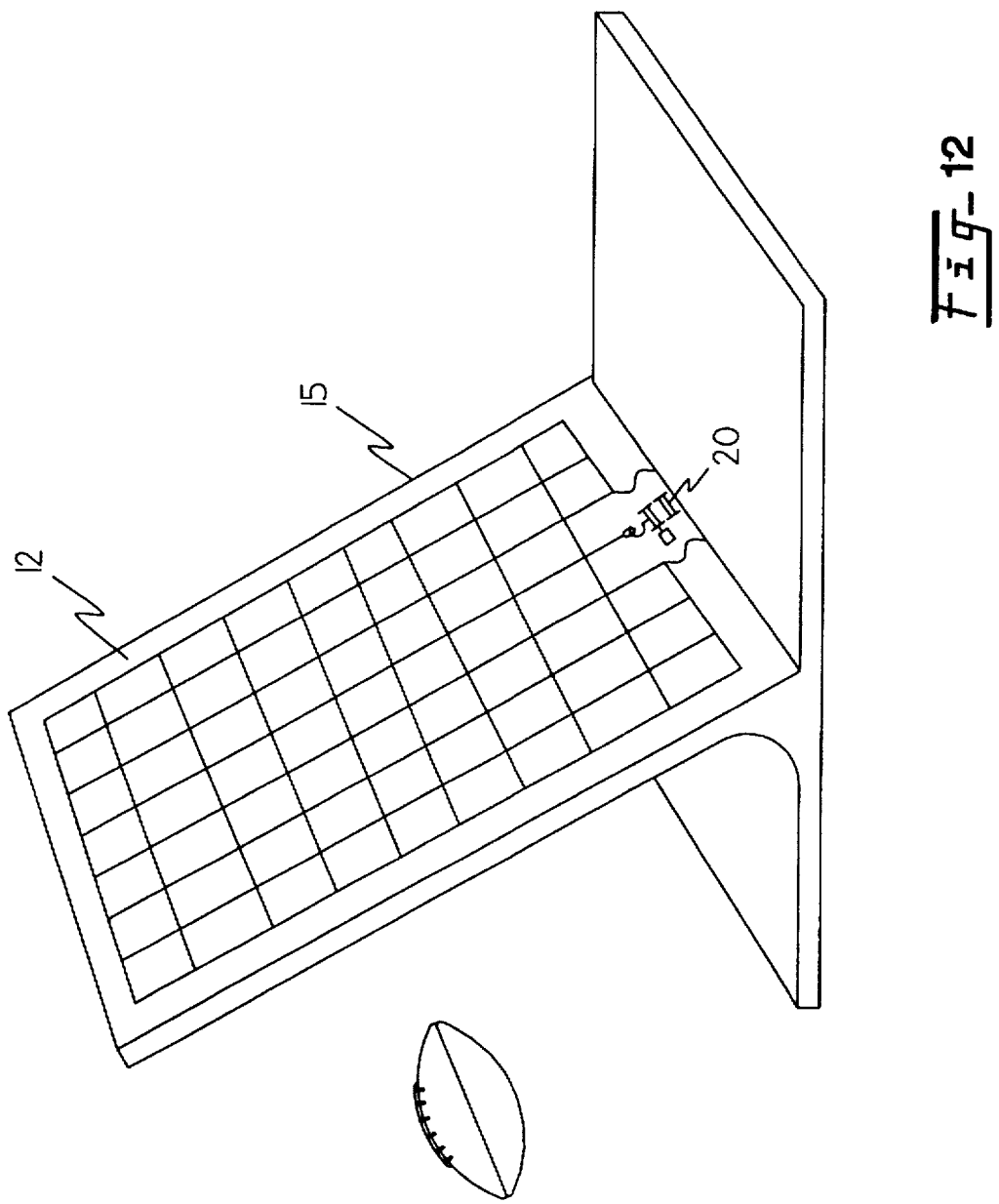

5,779,241

APPARATUS AND METHOD FOR MEASUREMENT OF POSITION AND VELOCITY

BACKGROUND OF THE INVENTION

This invention relates to a sensor for measuring the position of and the velocity of an object, and more particularly to a mechanical umpire useful for calling balls and strikes for baseball training.

FIELD OF THE INVENTION

The prior art includes a number of devices for measuring the velocity of and the position of an object, such as a baseball or softball. Many of these devices are used in sports related training. These prior art devices often employ rigid bodies as sensors. In the prior art, an object impacts a rigid body closing a mechanical switch. These prior art devices suffer from problems related to vibration of less resilient elements, mechanical waves propagated through the material and equipment wear.

Other prior art devices employ light curtains or radar guns to determine speed and location. Dust and dirt, often present in training environments, may affect these devices. There is a danger of objects striking the frame of these devices, causing vibration, thus effecting their operation. Furthermore, these devices may require complex electronics for data processing and computation of desired parameters. These devices have shown not to be robust in use and suffer weather related failures.

It is therefore one motivation of the invention to provide a more robust device that is shock resistant and durable.

SUMMARY OF THE INVENTION

The invention provides a sensor for locating the position of and measuring the velocity of an object. The sensor employs a net comprising an array of strings. A predetermined number of strings are tied to individual sensor modules. Each sensor module is attached to a frame. The frame acts to shape the net; in one embodiment the frame tightly suspends the net in a flat shape. Each sensor module senses the velocity of the associated string and converts the velocity into an electronic signal. The electronic signals from all the sensors are converted to the velocity of the object and the location of the object at impact with the net.

In one embodiment the sensor comprises an output drum, a take up drum, a spring and a motor. Predetermined strings of the net may be attached to a cord. The cord is wound on a spring loaded output drum. The drum is coaxial with the motor, which generates a voltage proportional to the angular velocity of the drum when spun. A diode electrically damps the signal from the motor on the return stroke. The motor dissipates part of the energy of impact as heat on a return stroke in response to the restorative force of the spring. Excess length of the cord is wound around the output drum. The output drum and the spring bias the system toward a rest position. An object impacting the net draws the cord from the output drum generating a voltage from a motor attached to the output drum. The velocity of impact may be determined by either a maximum voltage or, in an alternate embodiment, a time integrated voltage generated by the motors in the sensor modules.

Each particular net has an associated set of axes. A pair of sensors, their position known relative to the frame, are placed along these axes attached to each string. The position of impact may be determined by the motors generating the largest voltage. Alternatively, the impact position may be determined by the two pairs of sensors generating the highest voltage, where each sensor in a sensor pair is connected by a cord to the same string or strings.

The invention may be used to call balls and strikes for a pitched baseball, determine the trajectory of and the velocity of a golf ball and other objects.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIGS. 4A, 4B and 4C show examples of the deflection of the net of the invention during impact.

FIGS. 4F1, 4F2, 4F3 and 4G1, 4G2, and 4G3 show an example of determining trajectory information using a double net system.

FIGS. 7A and 7B show sample outputs of an operation of one possible embodiment of the invention used to determine the location of an impact.

FIGS. 11A1, 11A2 and 11B1 and 11B2 show the invention with a hemispherical net with either a radial or grid net.

FIG. 12 shows the invention configured at an angle for applications such as football and soccer.

DETAILED DESCRIPTION OF THE PREFERRED EMBODIMENT

Figure 1A:
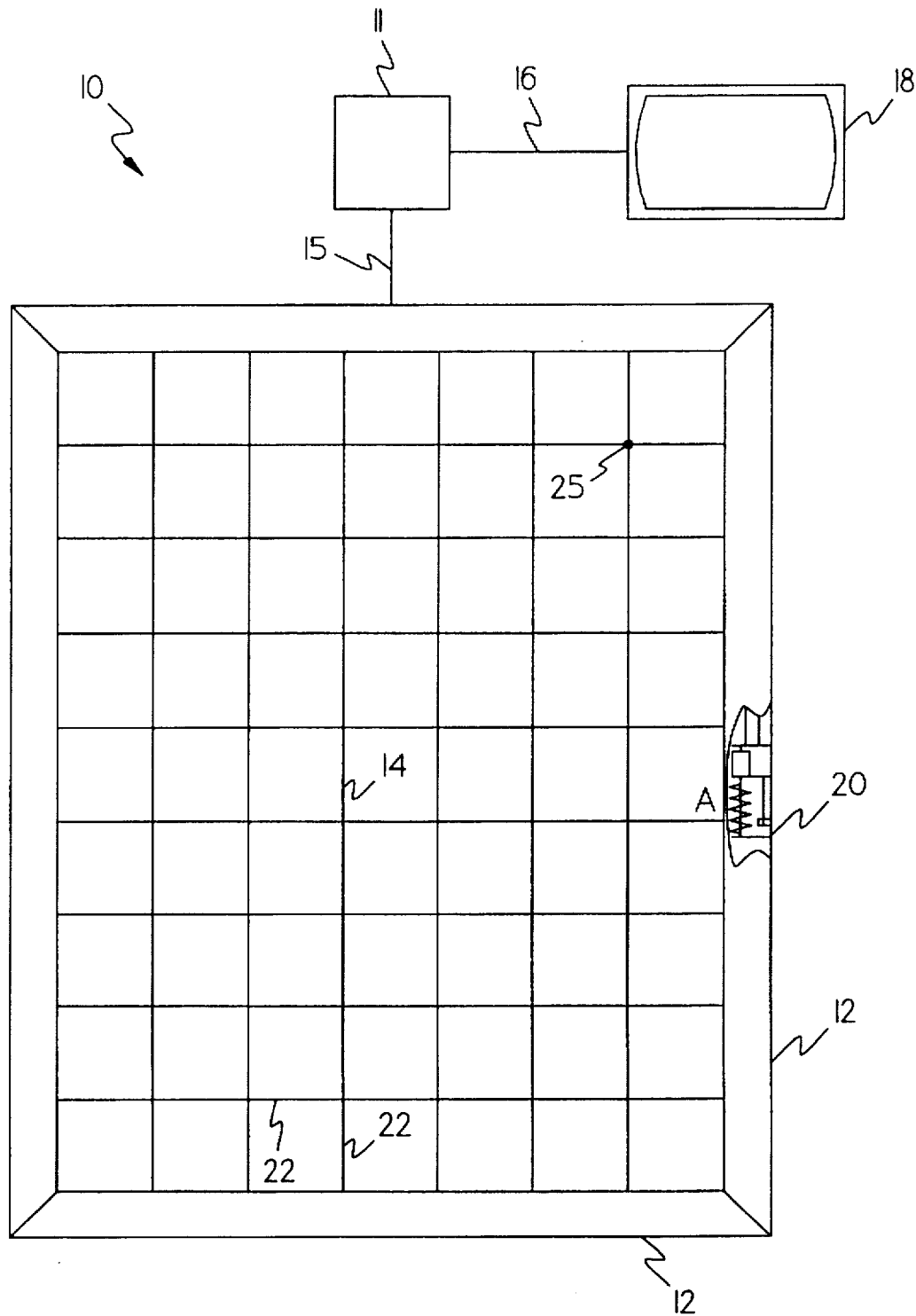
FIG. 1A shows a schematic of the measurement apparatus of the invention.
Figure 1B:
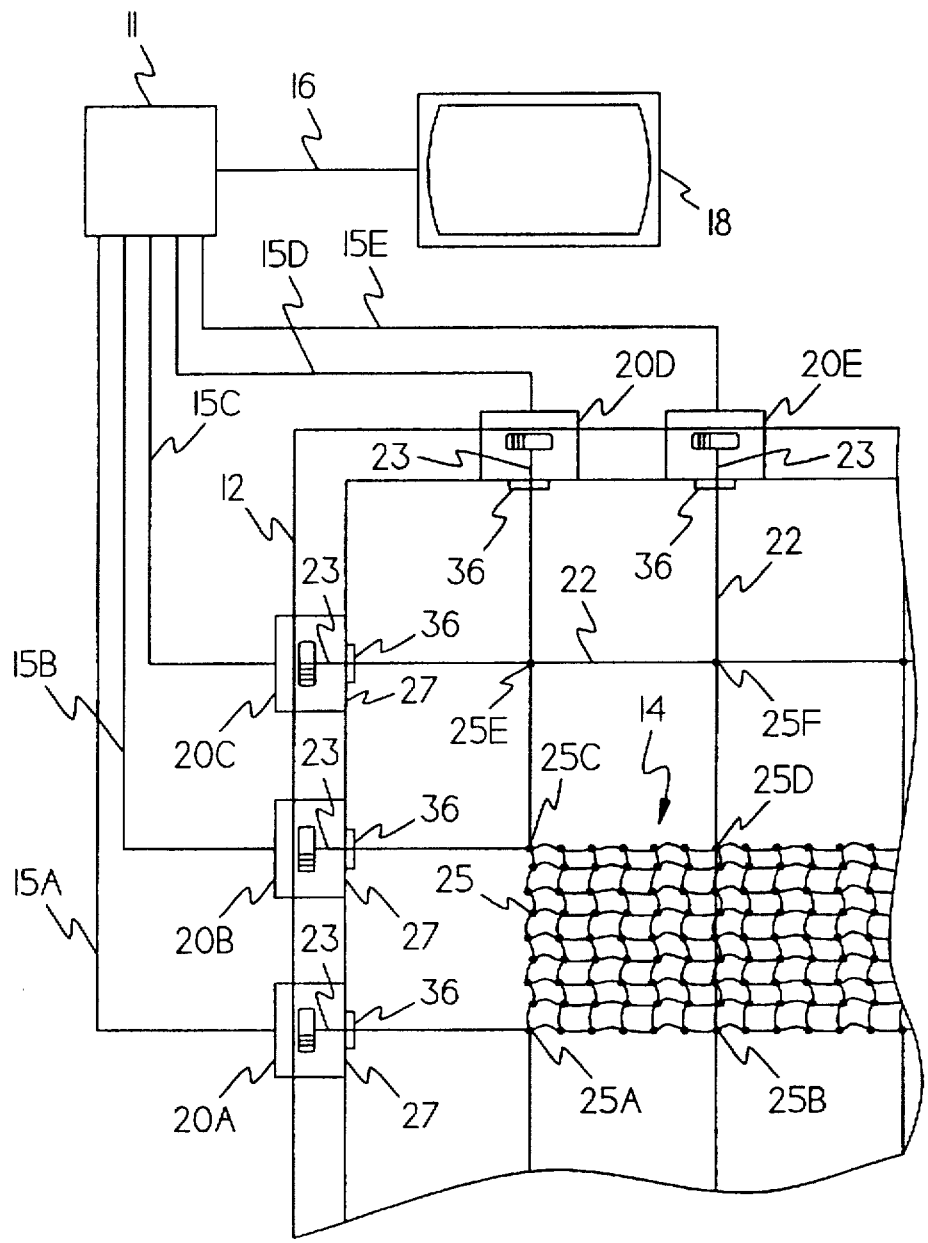
FIG. 1B shows a close up of the detail of the net.

Refer now to FIGS. 1A and 1B which show a schematic of the object position and velocity sensor 10 of the invention. The object position and velocity sensor 10 of the invention comprises a frame 12 and a net 14. The object position and velocity sensor 10 also includes an electrical connection 16 to a display unit 18 and a plurality of sensor modules 20; only one sensor module 20 is shown in FIG. 1A for clarity. A plurality of strings 22 form the net 14. The net 14 may be a rectangular net, as shown, or may be in other shapes such as circular. A circular net is shown in more detail in FIGS. 11A1, 11A2 and 11B1 11B2. The frame 12 provides support for the plurality of cords 23 and may have holes provided at predetermined intervals where cords 23 pass through and attach to strings 22.

In one preferred embodiment, the holes may provide for an uniform distribution of the plurality of cords 23 as shown in FIG. 1A. Each one of the plurality of cords 23 passes through the holes and is attached at one end to one or more strings and at a second end to a sensor module 20. In this example embodiment, a separate sensor module 20 attaches to each end of each one of the plurality of strings 22 by a cord 23. In alternate embodiments alternating strings of the net may be attached to sensor modules.

As shown in greater detail in FIG. 1B, the mesh size of the net 14 is not limited by the number of cords 23 and sensors 20. The mesh size may be determined according to a desired application, for example, using a small mesh size for a golf ball, a larger mesh size for a baseball, and an even larger mesh size for a softball. For baseball, the net may comprise 1⅛ in² mesh, attached to a nylon monofilament cord having a 50 lb. breaking strength. The strings 22 of the net 14 may be connected at nodes 25, keeping an impacting object from passing through the net 14.

Figure 6A:
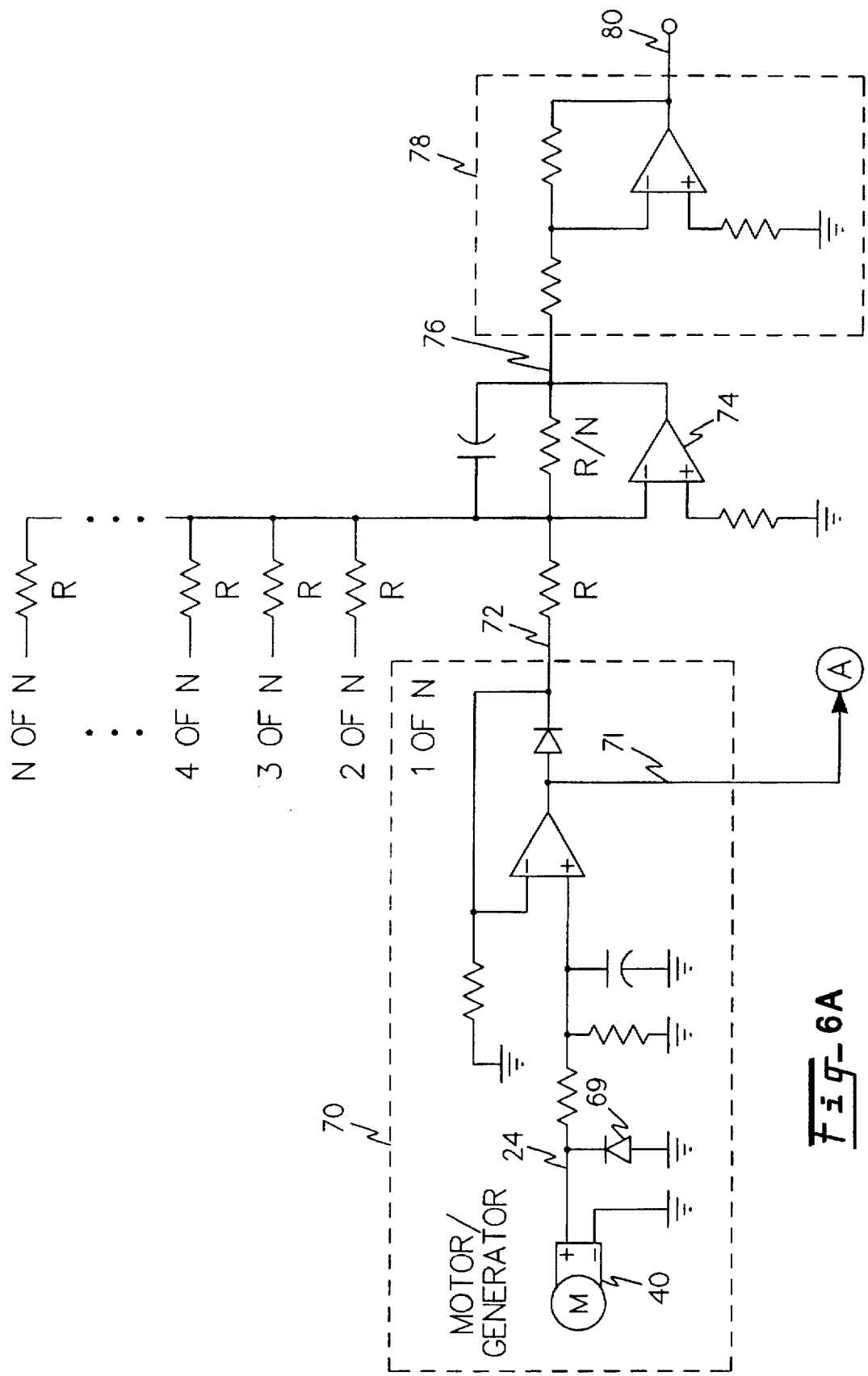
FIGS. 6A and 6B show a schematic of one example embodiment of the controller of the invention.
Figure 6B:
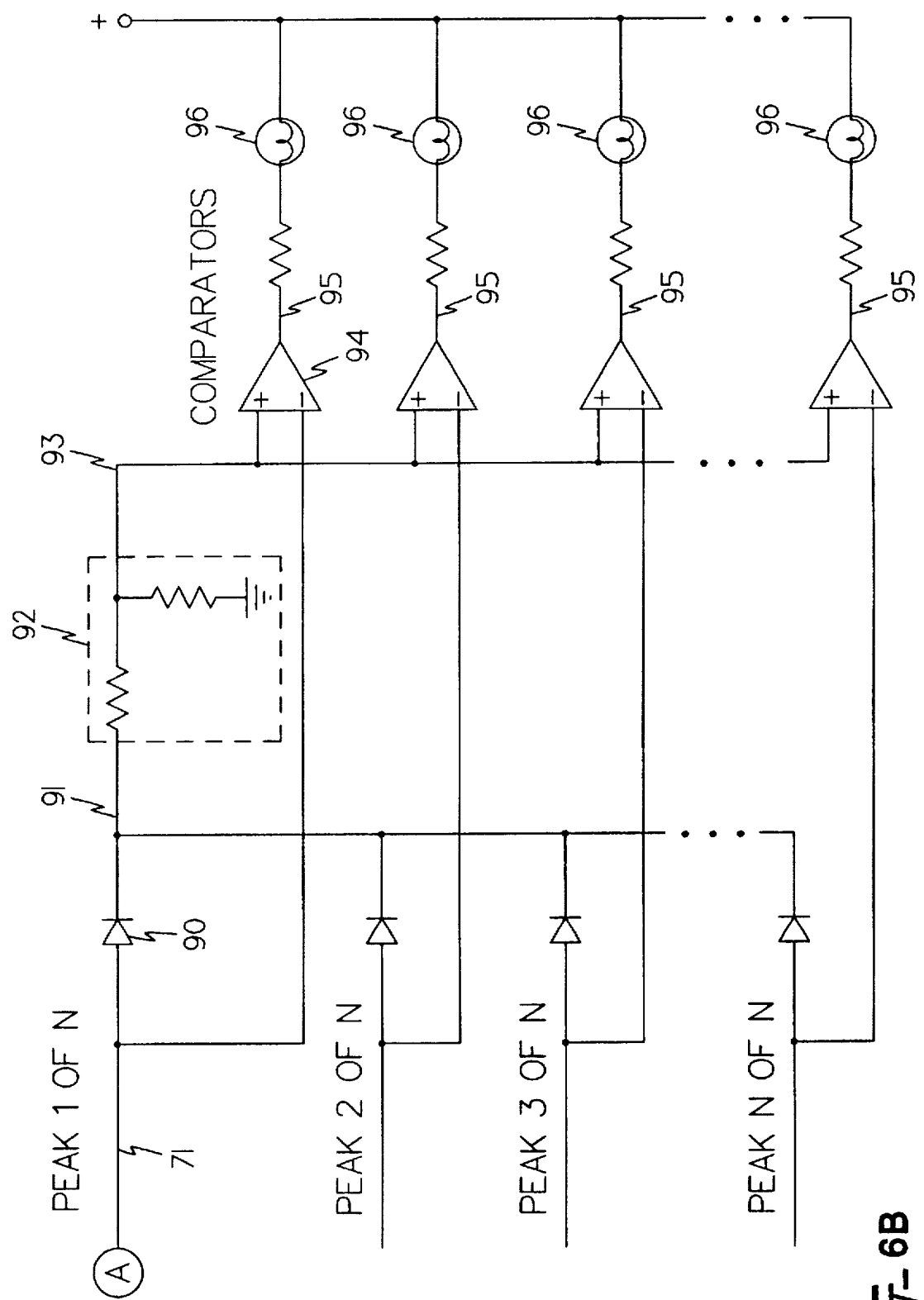

During impact, from a thrown baseball for instance, the sensor modules 20A–20E provide a voltage output on lines 15A–15E to be further processed by controller 11. Controller 11 processes the voltage signals as shown in FIGS. 6A and 6B on lines 15A–15E into useful information such as location, velocity, "balls and strikes" and trajectory. The controller 11 provides a processed signal 16 for display on the display unit 18. For example, an impact centering on node 25B causes generation of voltage signals from sensors 20A–20E. Sensors 20A and 20E may be expected to generate the maximum voltage. In one embodiment of this invention, processing of the voltage signals from sensors 20A–20E by controller 11 captures this information.

Figure 1C:
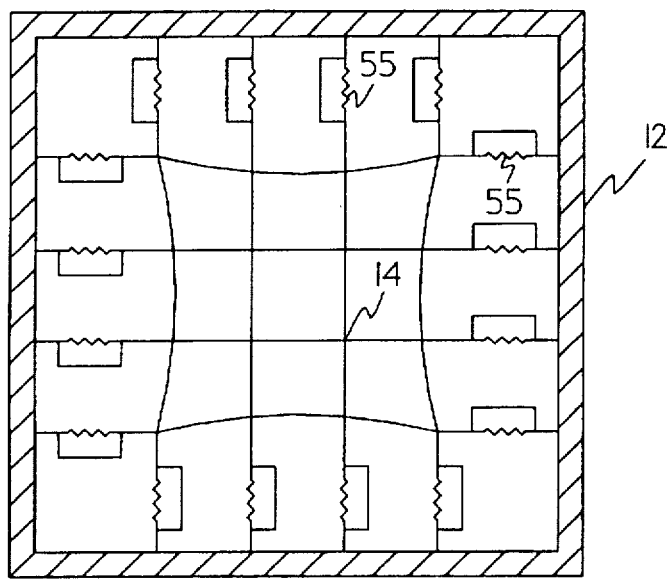
FIG. 1C shows an alternate embodiment of the measurement apparatus of the invention.
Figure 1D:
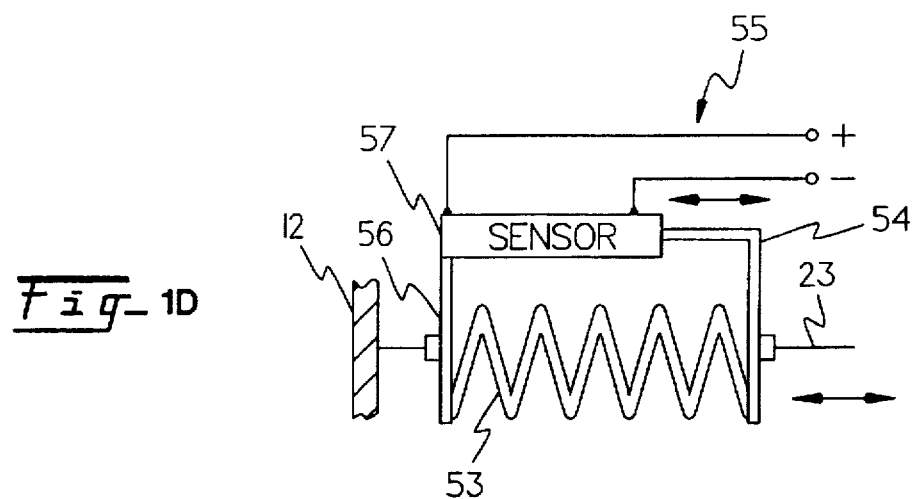
FIG. 1D shows a second alternate embodiment of the sensor module of the invention.

Now refer to FIGS. 1C and 1D which show an alternate net sensor combination of the invention. Net 14 is connected to frame 12 by spring sensors 55. Sensor 55 comprises a linear displacement sensor 57 which generates a voltage proportional to the extension of the spring 53. Spring 53 is connected to the sensor by bracket 54. Sensor 57 and spring 53 are attached to base 56 which is in turn attached to frame 12. Linear spring 53 is deflected by the object striking the net 14.

Figure 1E:
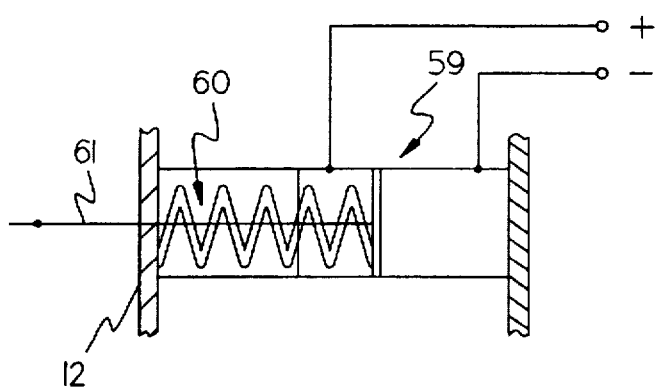
FIG. 1E shows a third alternate embodiment of the sensor module of the invention.

In a similar fashion, a linear displacement sensor 59 may be used to generate a voltage proportional to compression of a spring 60, as shown in FIG. 1E. Sensor 59 and spring 60 are attached to frame 12. A rod 61 attaches to spring 60 at one end and to net 14 at a second end. Deflection of net 14 pulls rod 61 compressing spring 60.

Those skilled in the art will recognize that the amount of energy absorbed by the net 14 and the springs will determine how far and how energetically the object or ball bounces off the net 14. For example, the net 14 can be configured to return a tennis ball back to the tennis player upon service or volley. Damping may be random to vary return of a volley. Furthermore, the motor and the diode may be configured to provide no or little return when desirable, as for example, in golf.

Figure 2A:
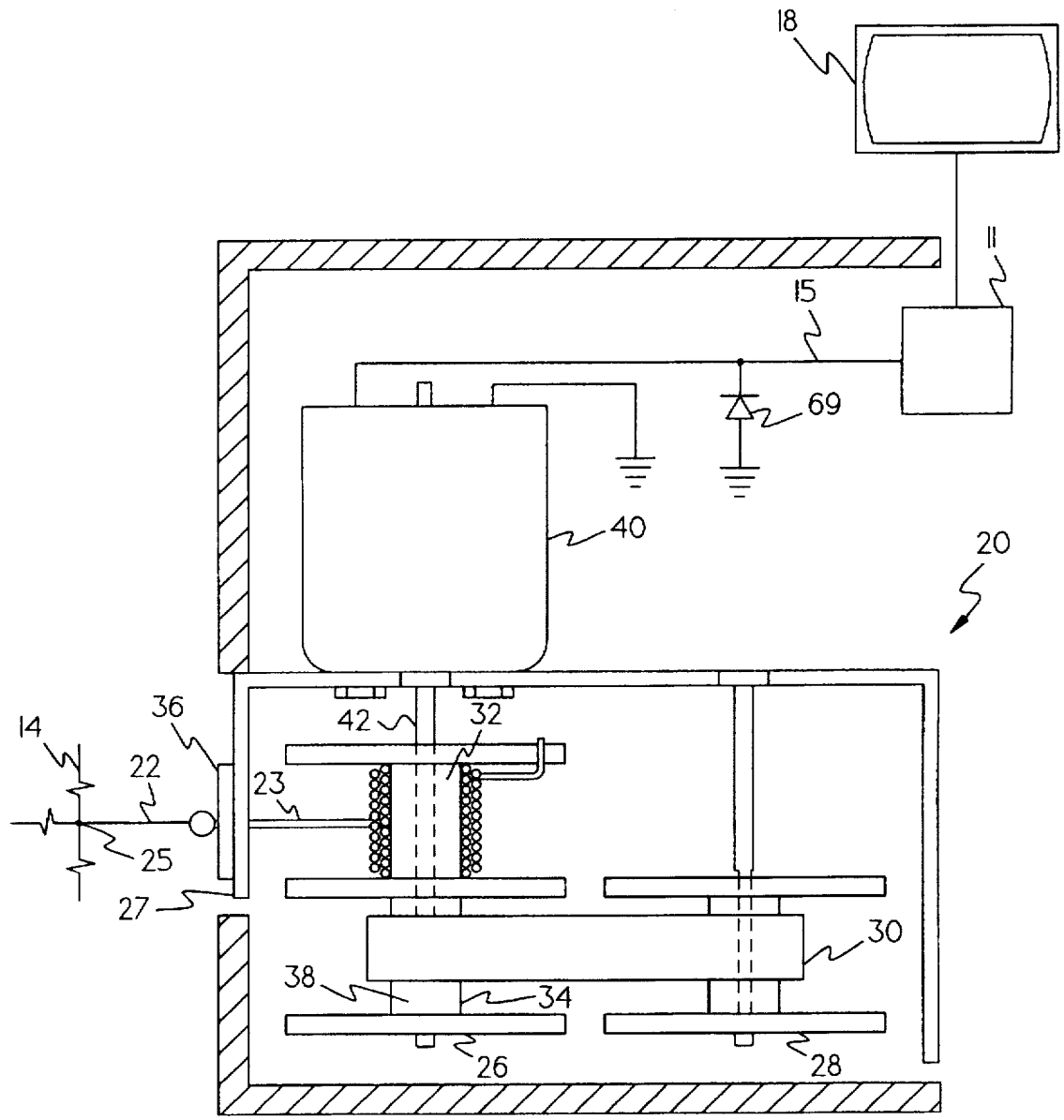
FIG. 2A shows a schematic of the sensor module of the invention.

Refer now to FIG. 2A which shows a schematic of one embodiment of the sensor module 20. The sensor module 20 comprises an output drum 26 coupled by a spring 30 to a take up drum 28. The output drum 26 further includes an upper spindle 32 and lower spindle 34. The cord 23 winds around and attaches to the upper spindle 32. The spring 30 attaches to the lower spindle 34 of the output drum 26. The spring 30 provides a biasing force for rotating the output drum 26 to wind up the cord 23. A rubber stop 36 attaches to the cord 23 and prevents the output drum 26 from winding up the cord 23 past a predetermined point. When the object position and velocity sensor 10 of the invention is at rest, the spring biasing force causes the rubber stop 36 to abut the face 27 of the sensor module 20. A shaft 42 of motor 40 is aligned with, and attaches to, an axis 38 of the output drum 26. The sensor module 20 may have a modular design to be easily attached and detached from frame 12.

During operation of the sensor module 20, shaft 42 rotates with the output drum 26 when cord 23 is extended. The cord 23 is extended when an object impacts net 14 and string 22 pulls cord 23. The net 14, in conjunction with motor 40 and spring 30, acts to decelerate the object. During deceleration, the cord 23 attaching to the net 14 is pulled from the output drum 26. The extraction of the cord 23 from the output drum 26 rotates the axis 38 of the output drum 26 and the shaft 42 of the motor 40. Rotation of the shaft 42 of the motor 40 generates a voltage in proportion to the rate of rotation of the shaft 42. After impact, the spring biasing force returns the apparatus of the invention 10 to a rest state. The spring 30 winds up the cord 23, pulling the net 14 taut. A diode 69 may be connected across the motor terminals, damping a voltage signal from the motor 40 during return to the rest state, and damping return response of motor, spring, net and object.

Generation of a sensor signal may be accomplished in this manner without requiring an external power source for the sensor module 20. Rotation of the output drum 26 also acts on the take up drum 28 through spring 30. Subsequent to impact, the take up drum 28 and spring 30 return the output drum 26 to a resting position. The output voltage is provided to controller 11 for display on the display unit 18.

Generation of the voltage signal on line 15, as well as heat generation in the sensor, dissipates energy from the impacting ball, while the spring stores energy from the ball.

In addition, different motor 40 and diode 69 combinations may be used to control the amount of energy left in the impacting object. In one preferred embodiment of the invention, the motor 40 may comprise a commercially available model FK-280PA, available from Mabuchi, located in New York, and the spring may comprise a constant force spring, such as a model B.A. 1, available from Tensator, located in Kentucky.

Figure 2B:
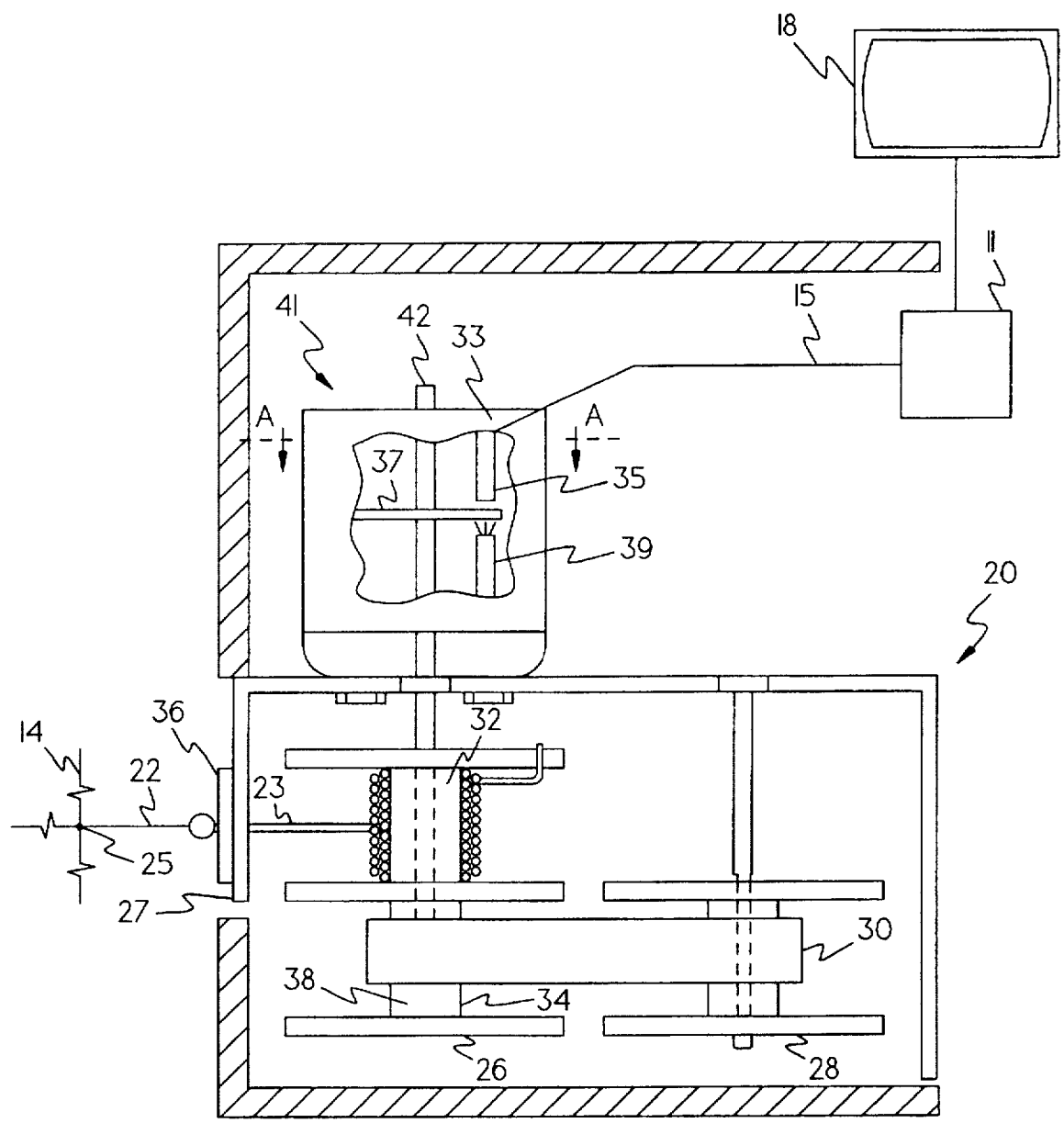
FIG. 2B shows an embodiment of the sensor module of the invention using an optical encoder.

Now refer to FIG. 2B which shows an alternate angular velocity sensor 41 used in the sensor module 20. An optical encoder 33 generates a sensor signal on line 15 in relation to the position of shaft 42. Light 39 is interrupted by spokes in disk 37. Light sensor 35 detects the interrupted beam and generates pulses as shaft 42 rotates. Velocity of the shaft 42 may then be determined by conventional means. Those skilled in the art will recognize that other types of optical encoders may also be used.

Figure 2C:
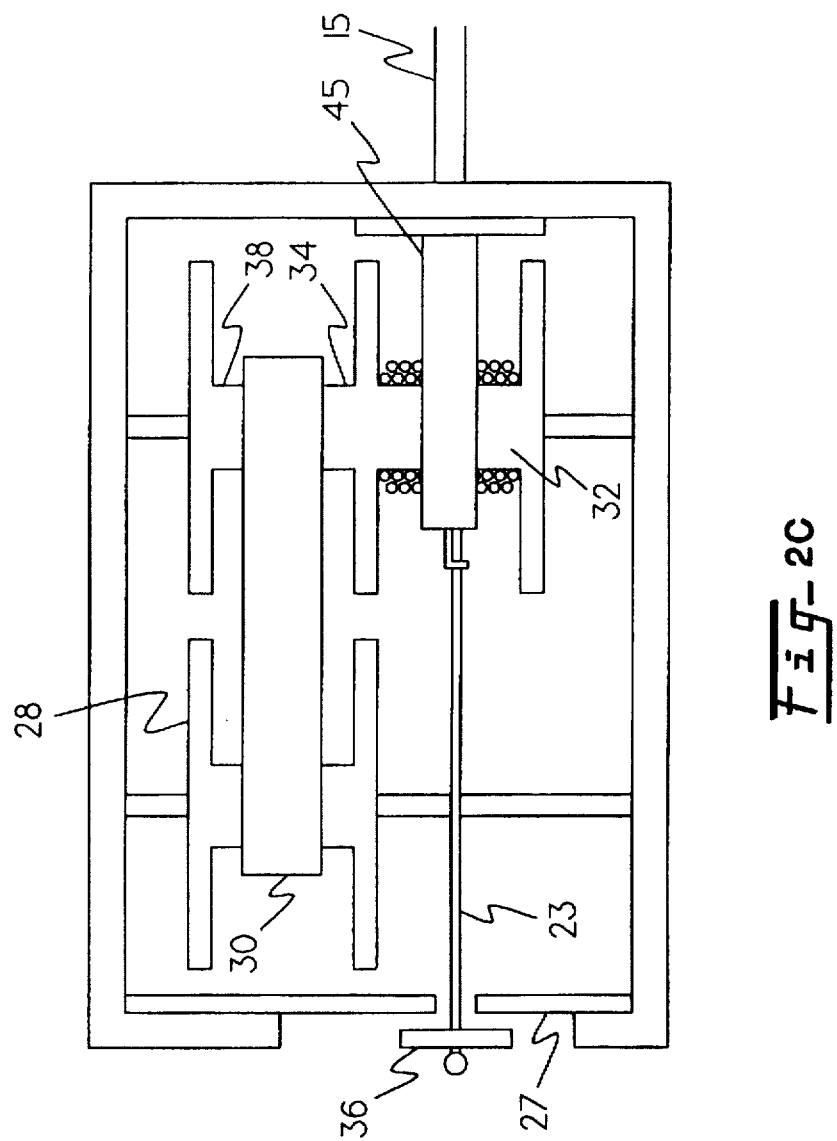
FIG. 2C shows an embodiment of the sensor module of the invention using a linear displacement sensor.

Now refer to FIG. 2C which shows an alternate linear position sensor used in sensor module 20. A linear displacement sensor 45 is attached to cord 23. As cord 23 is extended the linear displacement sensor 45 generates a displacement signal on line 15. Velocity of the cord 23 is proportional to the signal on line 15. Those skilled in the art will appreciate that other positional sensors may be used to determine the displacement of the string.

Figure 3A:
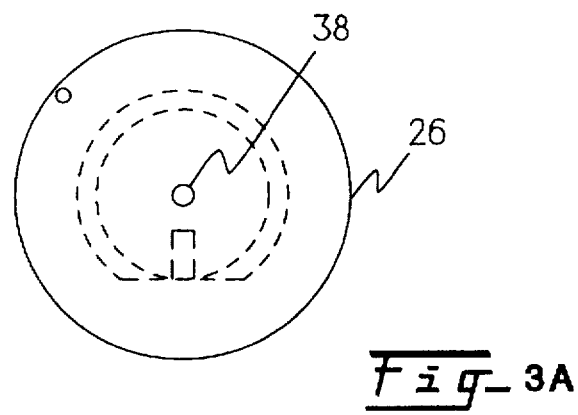
FIGS. 3A and 3B show detailed schematics of one embodiment of the output drum of the invention.
Figure 3B:
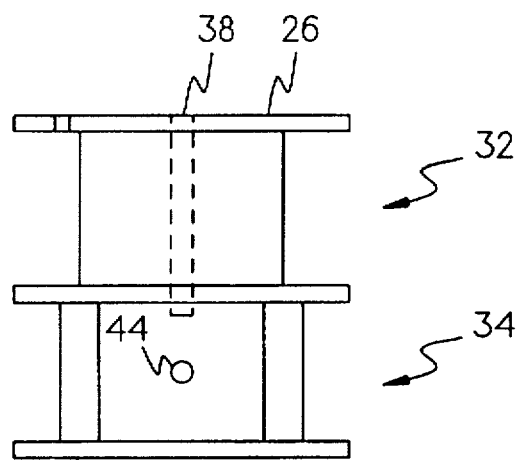

FIGS. 3A and 3B show detailed schematics of one embodiment of the output drum 26 of the invention. The output drum 26 of the invention may be constructed of high impact styrene. The axis 38 of the output drum 26 may be hollow. The axis 38 may be fitted to the shaft 42 of the motor 40 using a press fit technique. The lower spindle 34 may further include a notch 44 for attaching the spring 30 to the output drum 26.

FIGS. 4A, 4B and 4C show examples of the deflection of the net 14 during impact. A ball 50 impacts the net 14 causing the net 14 to deflect. The force of impact extracts the cords 23 from the output drums 26. The sensor modules 20 decelerate the ball 50. In one example embodiment, as shown in FIG. 4C, a padded backstop prevents overextension of the net 14 to prevent damage to the sensor modules 20 by exceeding operational limits. In operation, ball 50 is caught by net 14 and in the process, the net 14 pulls on cords 23 from sensors 201–237. In the example of FIG. 4A the ball 50 is impinging on net 14 to force the cord 23 from sensor modules 225, 235, 204 and 214 with the highest velocity and acceleration and longest travel along each of their respective rows and columns, thus the net 14 deforms maximally along the two axes defined by sensor modules 225, 235 and 204, 214. The sensor modules 20 farther away from the point of impact experience diminishing acceleration and where the net 14 is experiencing diminishing deformation.

Figure 4E:
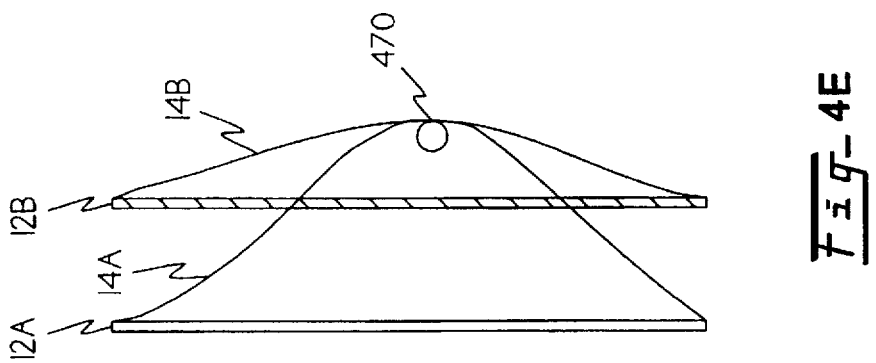
FIGS. 4D and 4E show examples of deflection of a double net system during impact.
Figure 4D:
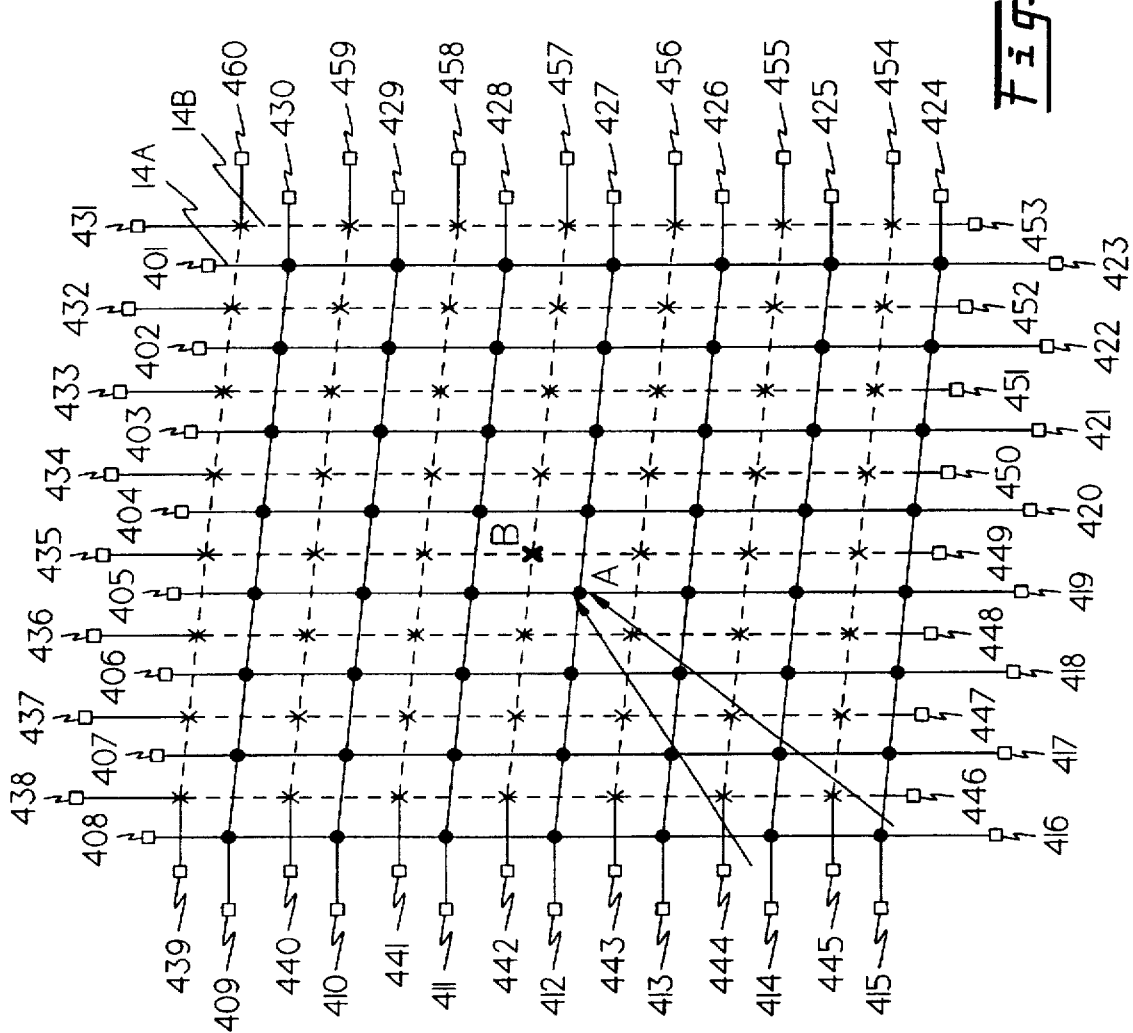

FIGS. 4D and 4E show examples of deflection of a double net system during impact. The double net system includes two nets 14A and 14B located within two frames 12A and 12B separated by a predetermined distance. Both nets 14A and 14B have associated sensors 401–460. Upon impact by an object 470, data from the sensors 401–460 may be used to determine trajectory information. In one embodiment, the controller 11 determines location of impact on each of the two nets 14A and 14B according to the method described above. The controller 11 may determine trajectory by comparing the location of impact on each of the two nets 14A and 14B and comparing with a predetermined distance between the respective planes in which the two nets 14A and 14B lie. In one embodiment, trajectory may be determined to lie on a line between these two points.

FIGS. 4F1 and 4F2 shows a double net configuration. Net ABCD is placed parallel to net EFGH. The two nets can have a different set of meshes, reticulation. Each net is configured in the manner described for the primary embodiment of a single net. FIGS. 4G1 and 4G2 shows a ball travelling along trajectory marked X-Y. As shown in the two views of the set of nets, the ball strikes net ABCD first, the net deforms and the ball captured by the first net strikes and deforms the second net EFGH. Using the procedure outlined for the single net embodiment, the position Na and Velocity Va of the impact of the ball with the first net and the position Nb of the second impact, following the first impact, of the ball with the second net EFGH, are computed. The ball is then said to be traveling with velocity Va along the trajectory defined by the position vector Vt=Nab.

Figure 5B:
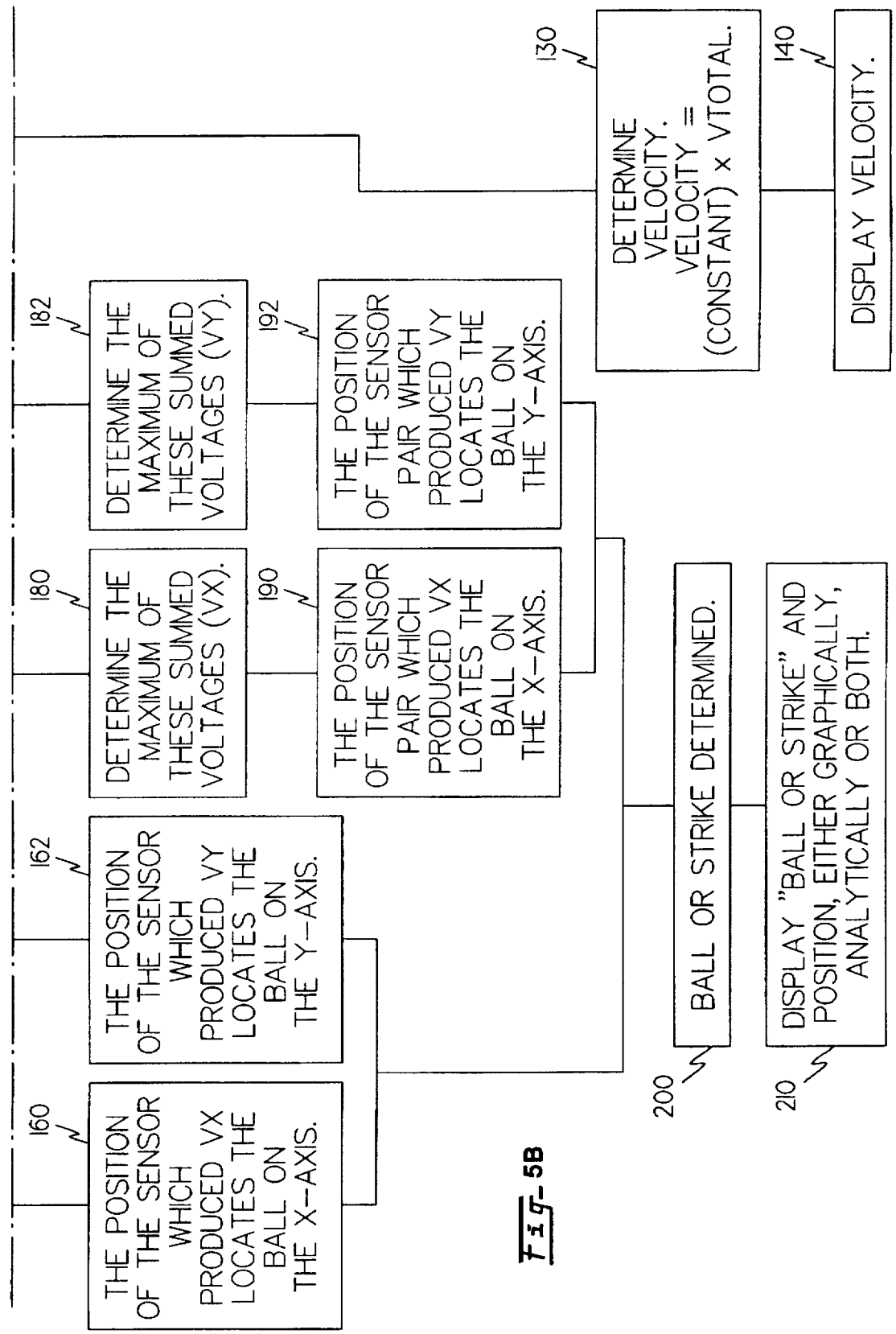
FIG. 5 shows a flow diagram of one embodiment of a process of the invention.

FIG. 5 shows a flow diagram of one embodiment of a process of the invention to determine velocity and position. In step 100, an impact on the net 14 by a baseball or other object activates the apparatus of the invention 10 and induces voltages in each motor 40 proportional to the angular velocity in each sensor module 20. The controller 11 may determine a maximum voltage (Vmax) in step 110 by integrating or summing the voltage produced by each sensor module 20 over a predetermined time period. Alternatively, the controller 11 may determine a maximum voltage Vmax by capturing and storing the voltage peak value in step 112. The process determines a total voltage (Vtotal) by summing Vmax for each sensor module 20 in step 120. The controller 11 computes velocity in step 130 as shown in Table 1. The controller 11 may then display the velocity on the display unit 18 in step 140.

The process also determines the position of the impact in steps 150 and 152. The controller 11 compares and determines the highest X-axis voltage (Vx) in step 150. The controller 11 compares and determines the highest Y-axis voltage (Vy) in step 152. In steps 160 and 162, the controller 11 locates the X-axis and Y-axis position using the position of the sensor modules 20 that produced Vx and Vy.

Alternatively, the process may determine the position of impact using the method in steps 170 and 172. The controller 11 may sum Vmax for each pair of sensor modules 20 attached to the same string in steps 170 and 172. The controller 11 compares and finds a maximum voltage Vx and Vy in step 180 and 182 and locates the impact on the X-axis and Y-axis using the positions of the sensor modules 20 producing the maximum voltages Vx and Vy in steps 190 and 192.

In one embodiment of the invention, where the impacting object may comprise a baseball, the controller 11 may determine a ball or strike in step 200. The controller 11 may then display either "Ball" or "Strike" and the position on the display unit 18 in step 210. The display may be either graphical, analytical, numerical or a combination.

FIGS. 6A and 6B show a schematic of one example embodiment of the controller 11 of the invention. The motor 40 may generate the output voltage signal 24. A diode 69 passes the output voltage signal 24 generated by an impact to the controller 11 and grounds a signal generated by return of the system to a resting position. A sample and hold circuit 70 captures a peak voltage of the output voltage signal 24 and provides a peak detected signal 72. A peak detected signal 72 is provided for each of the plurality of sensor modules 20. A summing amp 74 receives and sums the plurality of peak voltage signals 24. The summing amp 74 provides a total voltage output 76. A hold circuit 78 receives the total voltage output 76 and holds a maximum of the total voltage output and provides a total energy output 80.

The peak voltage signal 71 may be sent to a maximum peak detection circuit as shown in FIG. 6B. The maximum peak detection circuit receives a peak voltage signal 71 from each of the plurality of sensors. The peak voltage signals 71 are coupled such that a maximum peak voltage signal 91 is provided to a voltage divider 92. A diode 90 isolates the sample and hold circuit 70 from the maximum peak voltage signal 91. The voltage divider 92 provides a scaled peak signal 93 to a plurality of comparators 94. Each of the plurality of comparators receives and compares one of the peak voltage signals 71 to the scaled peak signal 93. The outputs 95 of the comparators 94 may then be provided to an LED array 96, where the LED corresponding to the max voltage is lighted.

Figure 6C:
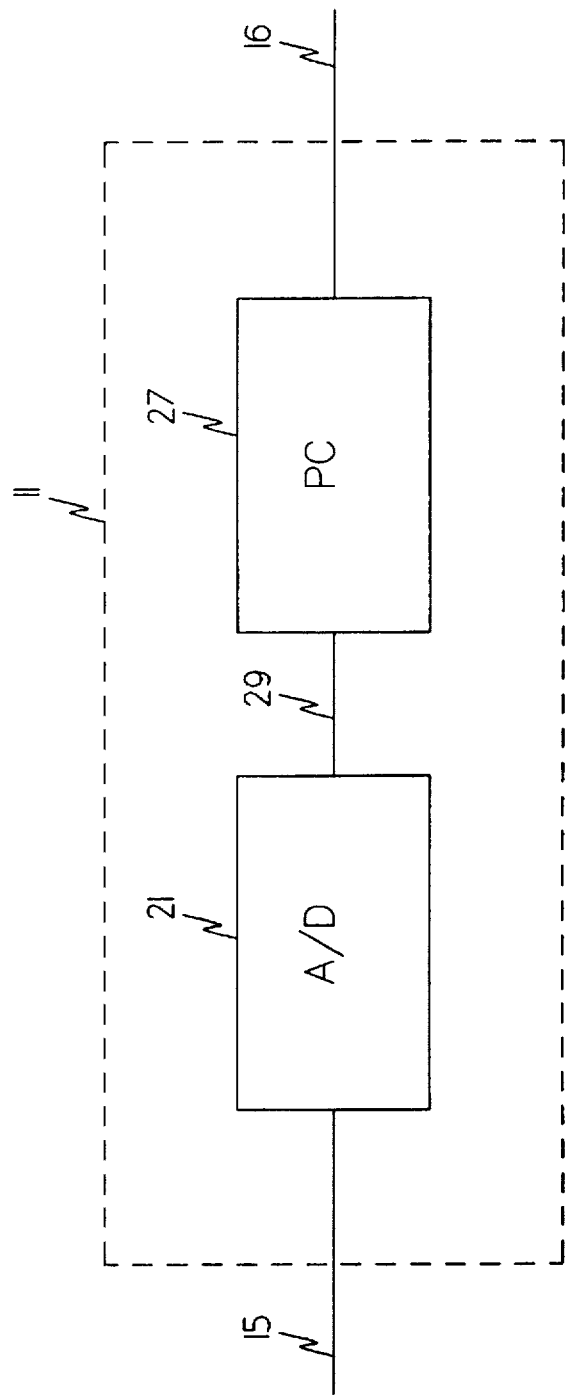
FIG. 6C shows an embodiment of the digital controller of the invention.

Now refer to FIG. 6C which shows another example embodiment of the controller 11 of the invention. Analog signal line 15 is connected to the analog input of analog to digital converter 21. The digital output of analog to digital converter 21 is connected to a microprocessor 27 in a conventional manner. The microprocessor 27 provides the position and velocity signal on line 16 for display to the user or for further processing. The microprocessor 27 can be a popular personal computer such as an Intel Pentium or x86 microprocessor based personal computer or MacIntosh personal computer running the PowerPC. The personal computer can store velocity and position data in permanent storage, such as a hard disk, for later use.

Figure 7B:
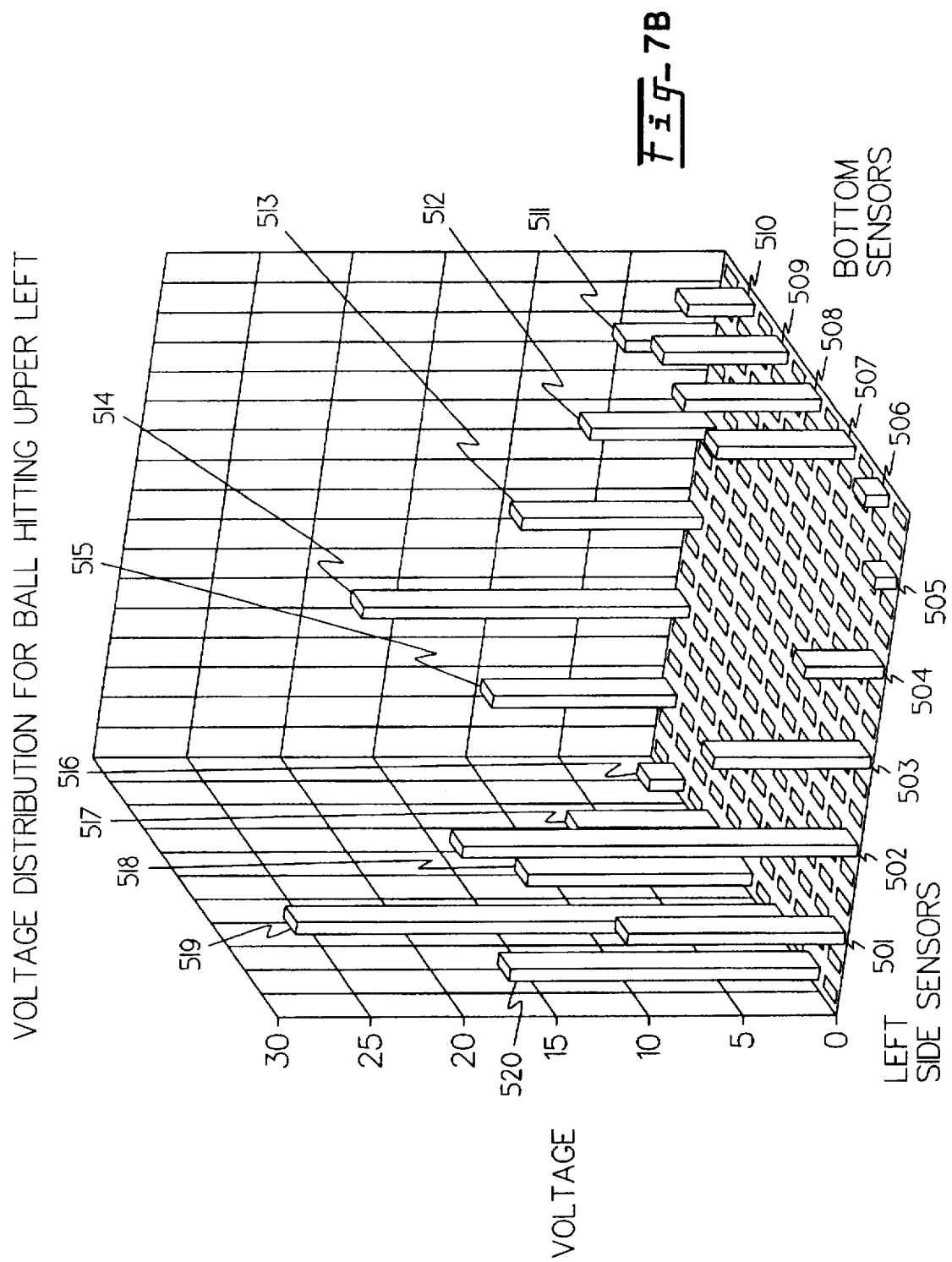
Figure 7C:
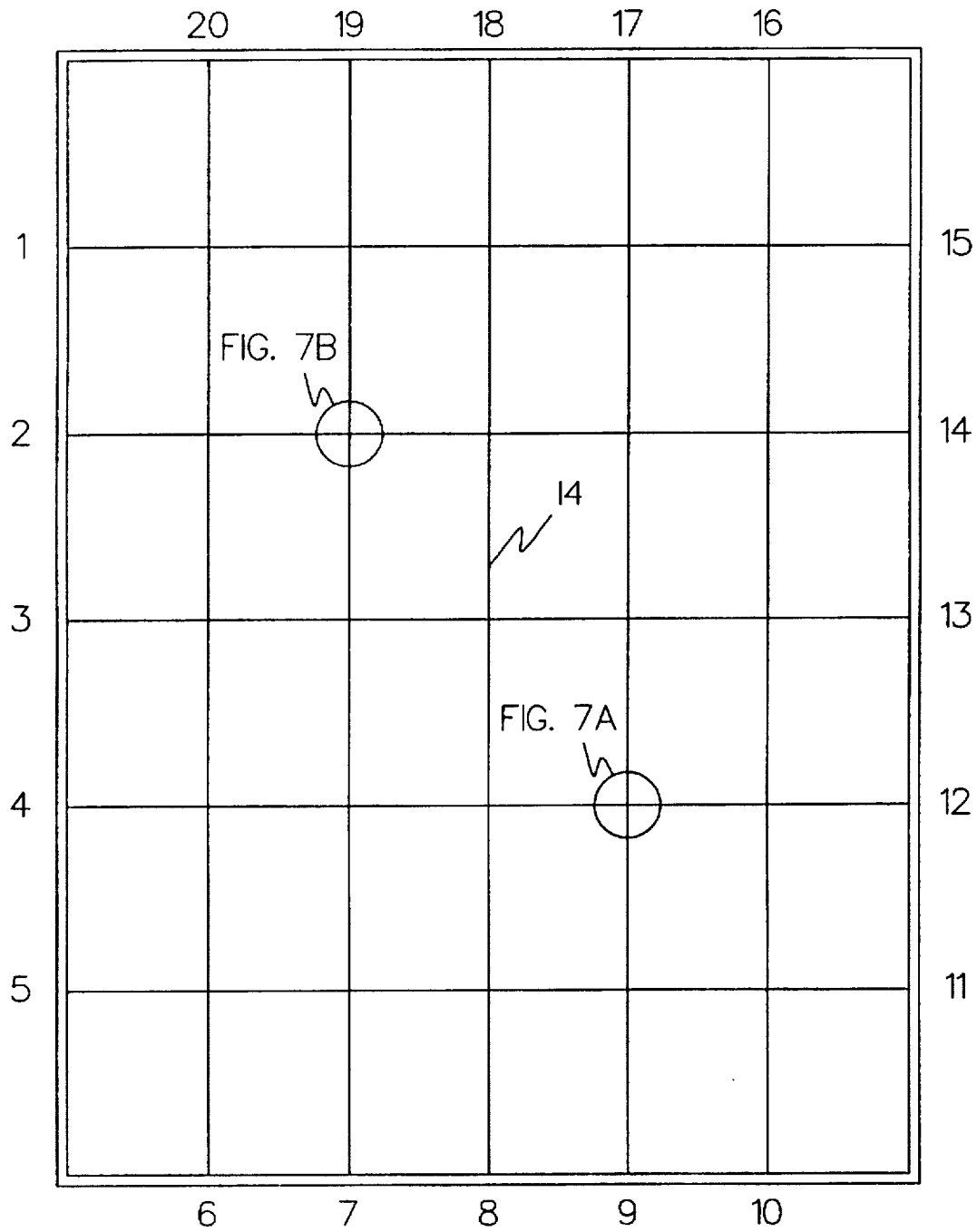
FIG. 7C graphically shows the location of the impact on the net.

FIGS. 7A and 7B show sample outputs of an operation of an alternate embodiment of the invention used to determine the location of an impact. FIG. 7A shows the operation of an apparatus having a net 14 having sensor outputs 301–320 from sensor modules 20 connected to a five by five array of cords 23. FIG. 7B shows the operation of an apparatus having a net 14 having sensor outputs 501–520 from sensor modules 20 connected to a five by five array of cords 23. Sensor outputs numbered 301 through 305 and 501 through 505 comprise the left side of the array of the apparatus. Sensor outputs 306 through 310 and 506 through 510 comprise the bottom of the array. Sensor outputs 311 through 315 and 511 through 515 comprise the right side of the array, and sensor outputs 316 through 320 and 516 through 520 comprise the top side of the array. FIG. 7A shows a measured output generated on a test prototype by a ball striking the lower right of the array on the intersection of the cords connected to sensor outputs 312 and 309. FIG. 7B shows a measured output generated on a test prototype by a ball striking the upper left of the array on the intersection of the cords connected to sensor modules 502 and 519. FIG. 7C graphically shows the locations of the impacts corresponding to the data shown in FIGS. 7A and 7B on the net 14. The rotation of the motor shaft 42 and the consequent electric voltage generated is a measure of the extensional deformation of the spring 30 and the consequent strain energy stored in the spring 30 as a result. The relative strengths of the motor 40 and spring 30 in a sensor module 20 determine the proportion of input energy to the sensor module 20 converted into electrical energy and stored as mechanical energy, respectively. The sum of the voltages generated by the motors in the sensors is a measure of the total energy input to the plurality of sensors as shown in the following equation:

$$E_B \propto \Sigma V_{mi}. \tag{1}$$

The net 14 is assumed to have negligible inertia as compared to the inertias of the spring 30 and motor 40. The strands of the net 14 mechanically couple the motions of the plurality of sensors. A movement of the net 14, such as when a ball strikes the net 14, can be potentially transmitted to one or more sensors inducing an appropriate motion in the spring/motor pair of each sensor module 20 thus affected.

A ball travelling at a velocity $V_B$ has kinetic energy at the instant of contact of:

$$E_B = \frac{1}{2} M_B V_B^2. \tag{2}$$

The ball imparts this energy $E_B$ to the net 14 over a period of time (t). The spatial distribution of the energy transmitted to the sensors is a function of the position of the net 14 where the ball makes contact. The sensor module 20 closest to the point of contact is imparted the largest fraction of the total energy $E_B$. Neglecting frictional, thermal, acoustic and other non-conservative energy losses in the system, the total energy EB is distributed amongst the plurality of sensors attached to the periphery of the net 14 over the time interval (t). Denoting by $E_i(\tau)$ the energy content of the $i^{th}$ sensor at some instant ($\tau$) the total energy $E_B$ is expressed as:

$$E_B = \sum_{i=1}^{N} \int_0^t E_{0i}(\tau)d\tau. \tag{3}$$

Denoting by $E_{Mi}(\tau)+E_{Si}(\tau)$ the energy at instant ($\tau$) in the motor 40 and spring 30 respectively comprising sensor (i,t):

$$\int_0^t E_{0i}(\tau)d\tau = \int_0^t E_{Mi}(\tau)d\tau + \int_0^t E_{Si}(\tau)d\tau \tag{4}$$

$$E_B = \sum_i \int_0^t E_{Mi}(\tau)d\tau + \int_0^t E_{Si}(\tau)d\tau. \tag{5}$$

Equation 5 will hold irrespective of the location of impact of the ball with the net 14. Denoting by $$E_S = \sum_i \int_0^t E_{Si}(\tau)d\tau \tag{6}$$

and $$E_M = \sum_i \int_0^t E_{Mi}(\tau)d\tau \tag{7}$$

we obtain $$E_B = E_M + E_S. \tag{8}$$

This equation (clarify this) holds at the instant all the energy in the ball has been transferred to the sensors. This is at the end of the time interval (t) when the ball has completed imparting its energy to the net 14.

From Equation 7:

$$E_M = \sum_{i=1}^{N} \int_0^t E_{Mi}(\tau)d\tau \tag{9}$$

the energy referred to is the voltage generated by the motor 40 denoted ($V_{Mi}$)

$$E_M = \sum_{i=1}^{n} \int_0^t V_{Mi}(\tau)d\tau. \tag{10}$$

In practice the time interval (0,t) is extremely small in the order of several milliseconds. The integral in Equation 10 may be approximated as a linear impulse for each sensor by:

$$\int_0^t V_{Mi}(\tau)d\tau = (V_{mi})_{peak}. \tag{11}$$

Equation 7 can be rewritten as:

$$E_M = \beta \sum_{i=1}^{n} (V_{mi})_{peak}. \tag{12}$$

From Equation 12 and Equation 1:

$$E_B \propto \Sigma \, (V_{LM})_{peak}.\tag{13}$$

Finally, it is well known that the energy in the ball $E_B$ is given by Equation 2:

$$E_B = \frac{1}{2} M_B V_B^2.\tag{14}$$

From Equations 13 and 2:

$$\frac{1}{2} M_B V_B^2 \propto \sum_{i=1}^{n} (V_{im})_{peak}.\tag{15}$$

Therefore, $$\upsilon \propto (\Sigma V_{im})^{1/2}.\tag{16}$$

Where:
$E_B$=Energy of ball
M=Mass of ball
$\upsilon$=Velocity of ball
$E_N$=Energy in net system
$E_S$=Energy stored in springs
$E_M$=Energy generated by motors
$L_i$=Extension of spring i
$K_i$=Spring stiffness constant
$\beta$=Motor constant
$V_{im}$=Voltage induced in $i^{th}$ motor

TABLE 1

Example Calculations of Position and Velocity of a 50 mph pitch

| Motor Number | Peak Voltage $V_i$ |
|---|---|
| 501 | 11.5 |
| 502 | 21.3 |
| 503 | 7.5 |
| 504 | 4.8 |
| 505 | 2.0 |
| 506 | 2.2 |
| 507 | 8.1 |
| 508 | 7.0 |
| 509 | 6.0 |
| 510 | 2.1 |
| 511 | 5.4 |
| 512 | 6.0 |
| 513 | 9.1 |
| 514 | 16.5 |
| 515 | 9.5 |
| 516 | 1.7 |
| 517 | 5.0 |
| 518 | 7.0 |
| 519 | 27.5 |
| 520 | 17.5 |

Table Corresponds to data shown in FIG. 7B.

In one embodiment of the invention as described above, determination of impact location may employ the maximum voltage generation along each axis. For example, in Table 1, corresponding to FIG. 7B, sensor 502 generated the maximum voltage along the y-axis equal to 21.3 volts. Sensor 519 generated the maximum voltage along the x-axis equal to 27.5 volts. The system determines that the ball struck at the intersection of sensors 502 and 519. In one embodiment of the invention the microprocessor 27 calculates the position and velocity by the above described methods.

Figure 8A:
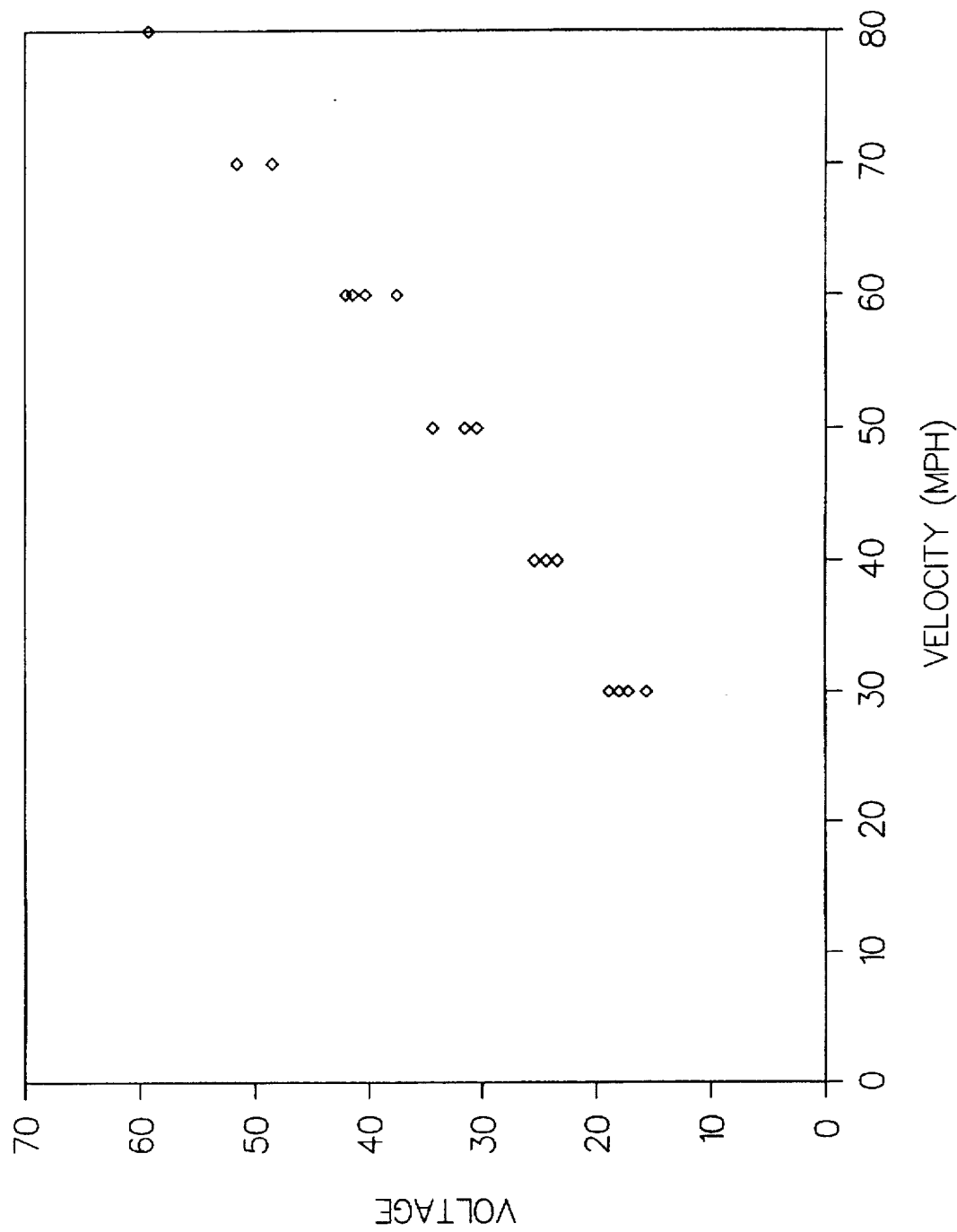
FIGS. 8A and 8B show sample outputs of an operation of one possible embodiment of the invention used to determine the velocity of an impact.
Figure 8B:
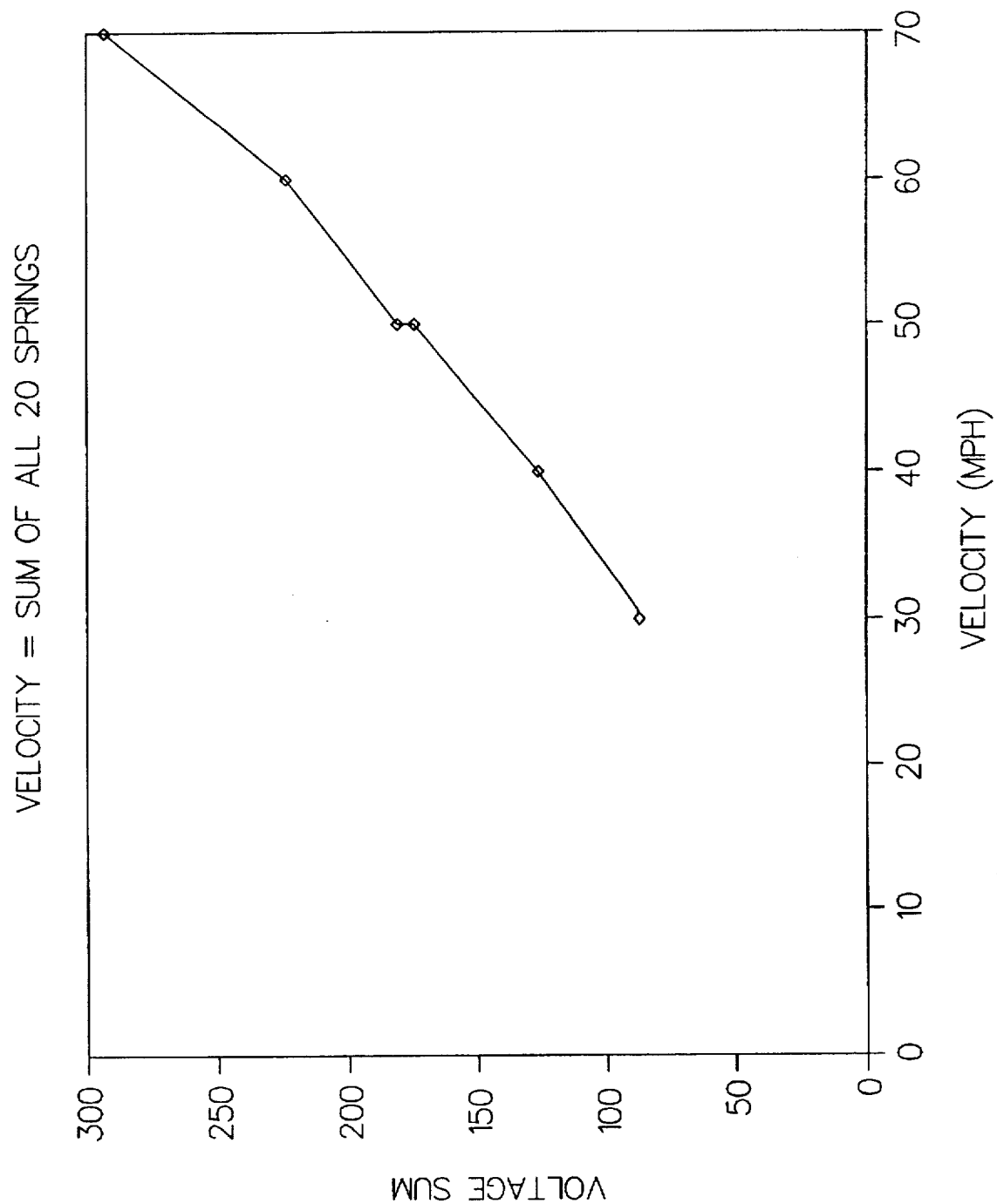

FIGS. 8A and 8B show sample outputs of an operation of one possible embodiment of the invention used to determine the velocity of an impact. FIG. 8A shows sample output voltages generated as a function of the velocity of the impact for a series of trials. The output voltages shown are sums of the four center sensors for a five by five array. FIG. 8B shows sample output voltages where the output voltages are the sum of all twenty sensors for a five by five array. Coefficients of the velocity equation may be determined by measuring impacts of known speed as shown in the example calculations.

Figure 9B:
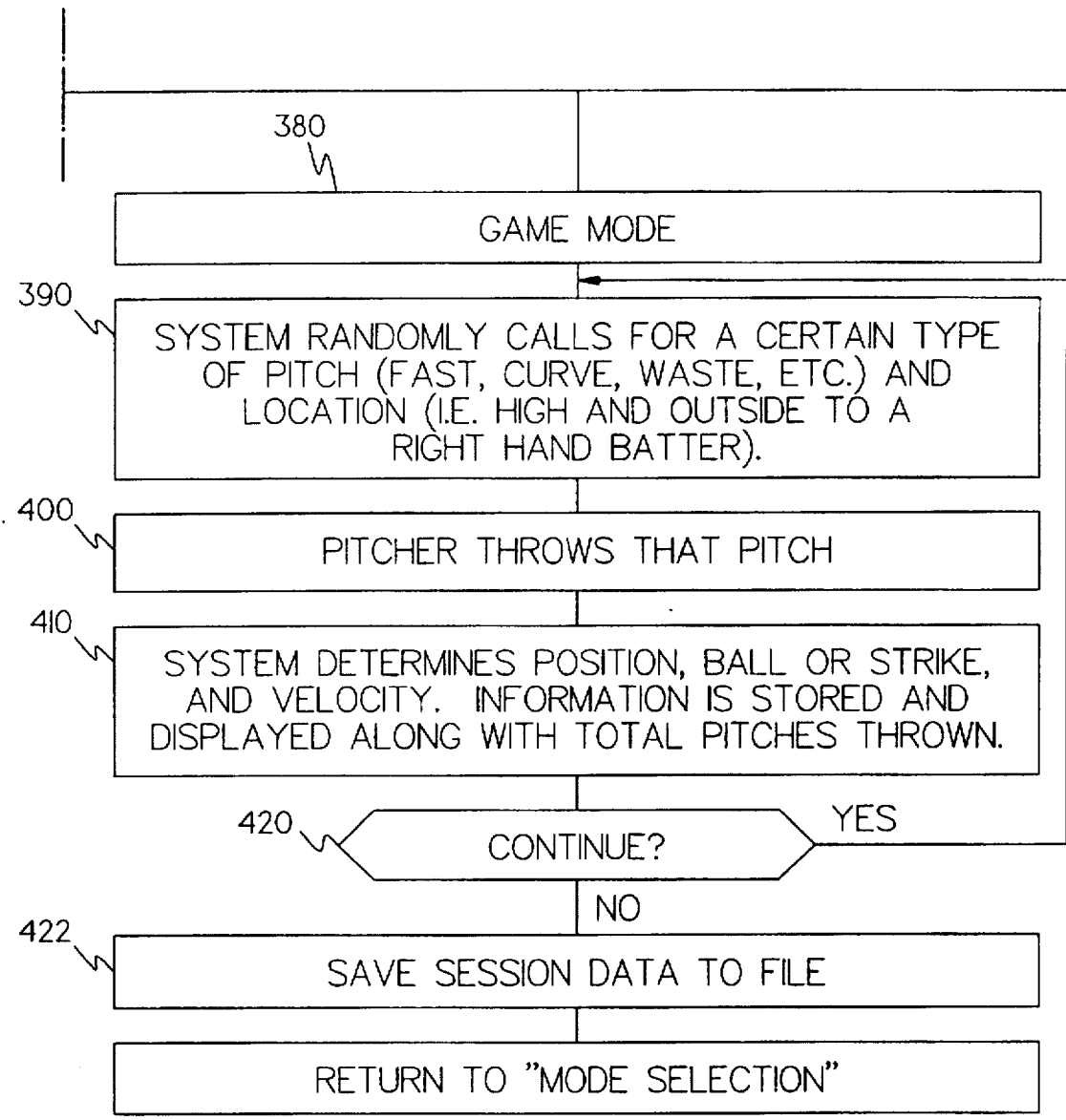
FIG. 9 shows one example embodiment of the system software used for baseball or softball.
Figure 9C:
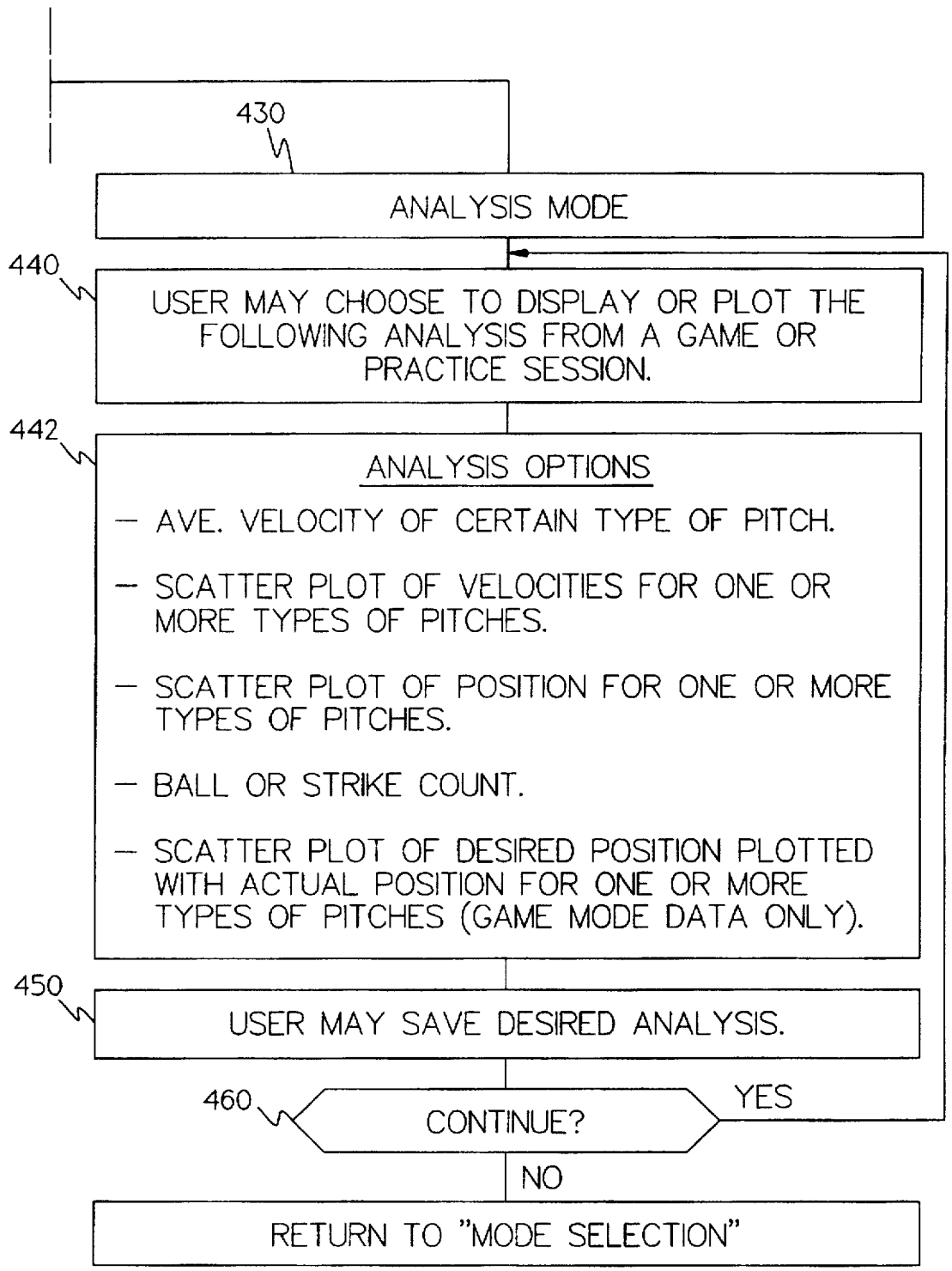

FIG. 9 shows one example embodiment of the system software used for baseball or softball. The system is powered on in step 300. A pitcher chooses a mode in step 310. The mode may either be a practice mode 320, a game mode 380 or an analysis mode 430. In the practice mode 320, the pitcher inputs a type of pitch to be thrown, such as a fast ball, curve, slider or knuckle ball in step 330. The pitcher throws the ball in step 340. On impact, the system determines a position, ball or strike, and velocity. The information may be stored and displayed, along with the total number of pitches thrown, in step 350. If the pitcher continues to throw pitches in step 360 the system loops back to step 330.

If the pitcher is finished, session data is stored in a file in step 370. The system then returns to the mode selection step 310.

In the game mode 380, the system may make random or prescribed sequences of calls for a certain type of pitch, such as a fast ball, a curve ball, a slider or a knuckle ball and a location, such as high and outside, in step 390. The pitcher throws the pitch in step 400. In step 410, the system determines the position, ball or strike information and velocity. This information is stored and displayed along with the total pitches thrown. The cycle continues until the pitcher exits the game mode and enters the analysis mode in step 420. If the pitcher is finished, session data is stored in a file in step 422.

In the analysis mode 430, the user may choose to display or plot an analysis from a game or practice session in step 440. Practice mode 320 analysis options may include the average velocity of a certain type of pitch, a scatter plot of velocities for one or more types of pitches, or a ball and strike count as shown in step 442. The game mode 380 analysis options may include the same options as for the practice mode 320, and may further include a scatter plot of desired positions plotted against the actual positions for one or more types of pitches as shown in step 442. The pitcher may save the analysis for later review in step 450. The pitcher may then select a different analysis in step 460 or return to the mode selection step 310.

Figure 10A:
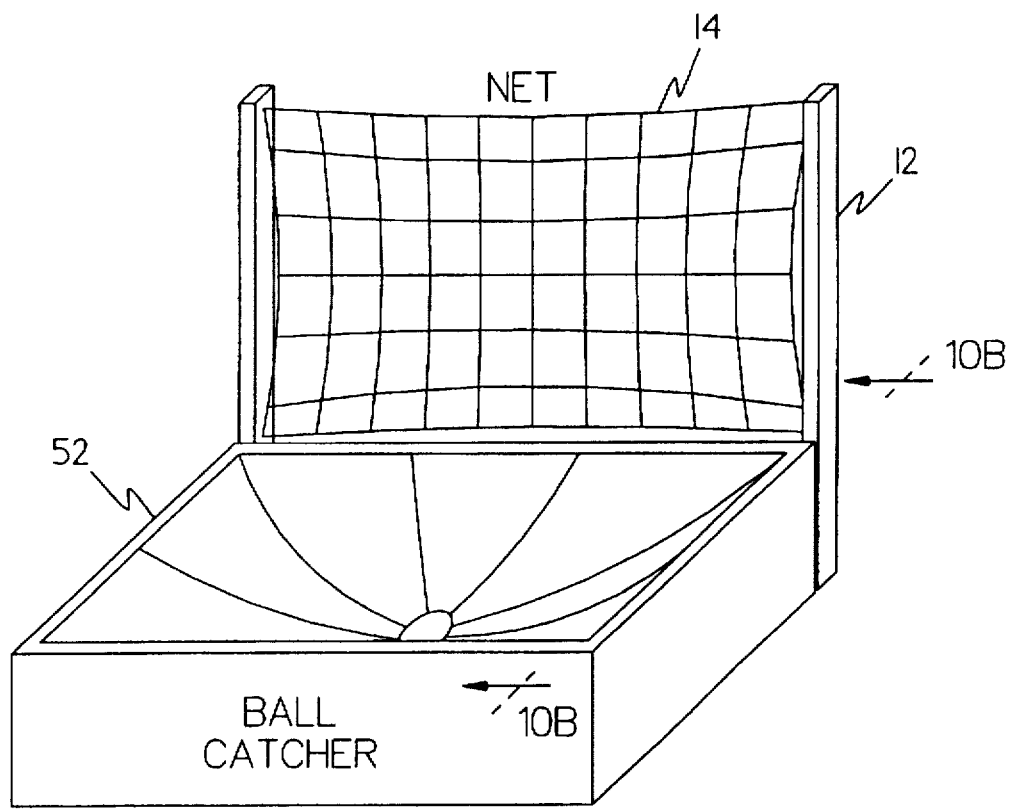
FIGS. 10A and 10B show an alternate embodiment of the measurement apparatus of the invention having a return system.
Figure 10B:
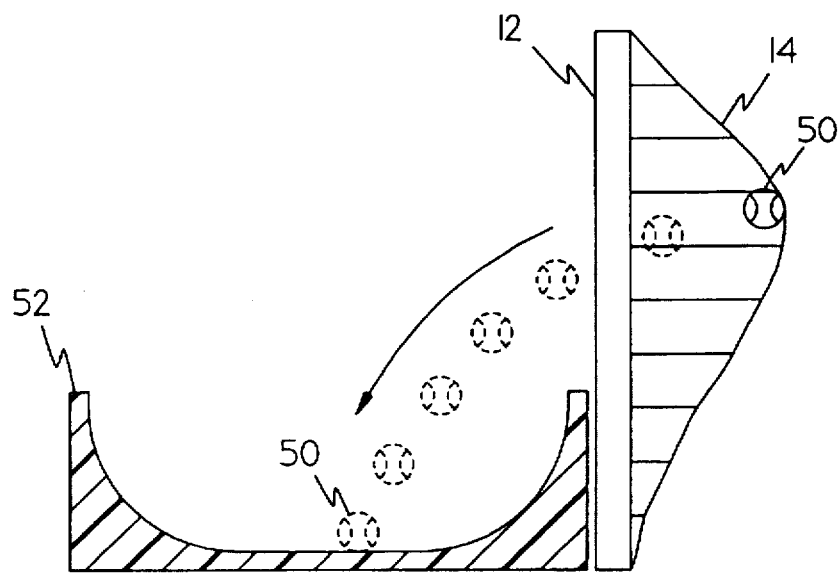

FIGS. 10A and 10B show an alternate embodiment of the measurement apparatus of the invention having a return system. A ball catcher 52 may be positioned to receive the ball 50 from the net 14. The motor and diode configuration may be chosen to return sufficient energy to the ball 50 to deposit the ball in the ball catcher 52.

Those skilled in the art will recognize that the net may be configured either in a planar format or a nonplanar format. In the planar format the shape of the net may be any planar shape. This would include rectangular, square, any number sided polygon, circular or oval. The plane of the net may then be placed in any orientation in space. For example, the current system for baseball is oriented 90 degrees to the ground. Other applications have the net at some other angle, such as a football place kicking embodiment where the net would be at an angle of about 60 degrees.

FIGS. 11A1 and 11A2 shows a net 49 radially configured. The nonplanar formation could be in the shape of a hemisphere or dome. The hemispherical or dome shape is useful for sports where spatial information is desired, such as in golf or football. Frame 47 contains a plurality of sensor modules 48 along its periphery. Sensor modules 48 provide information on velocity and position as described above. The net 49 shape can be maintained by a skeletal frame 79 that stretches out the netting. For example, the net 49 can be stretched by springs across a skeletal frame 79 constructed, for example, of thin plastic tubing, forming a hemispherical surface that establishes a starting position. Alternatively, external springs may stretch the net in a hemispherical surface.

FIGS. 11B1 and 11B2 shows a similar circular sensor embodiment where sensor modules 48 are similarly arrayed in frame 47 but the sensor modules are orthogonally positioned. Velocity and position are also calculated as described above.

FIG. 12 shows the frame 12 tilted for use in sports relating to football and soccer. This configuration is best suited for these types of velocity and position calculations. Those skilled in the art will recognize that other orientations relative to the field of play may be used based on the type of sports activity.

The invention can be used for a variety of sports related functions. For baseball or softball pitching training the invention can be used for measuring the position and velocity of pitched balls. For baseball or softball hitting training the invention can be used to measure the position and velocity of batted balls. The invention can also deposit caught balls in a predetermined location. For golf training the invention can be used to measure the position, velocity and direction of golf drives. In hockey the invention can be used to measure the position and velocity of the hockey puck. In soccer the invention can be used to measure the position and velocity of the kicked or struck soccer ball. In tennis the invention can be used to measure the position and velocity of a serve or volley, and the invention can return the tennis ball.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An apparatus for determining position and velocity of an object at impact, comprising:
   (a) a frame having a plurality of sensor mounts and an outer edge;
   (b) a plurality of sensor modules wherein one of the plurality of sensor mounts attaches a corresponding sensor module to the outer edge of the frame;
   (c) a means for capturing an object wherein the means for capturing an object is located within the frame and attached to the plurality of sensor modules by a plurality of cords;
   (d) a plurality of stops wherein one of the plurality of stops is attached to a corresponding one of the plurality of cords, wherein the plurality of stops provide a resting position for the apparatus at a predetermined point; and
   (e) a controller attached to receive electronic signals from the plurality of sensor modules, wherein the controller determines at least one kinematic parameter.

2. The apparatus of claim 1, further comprising a backing mounted behind the means for capturing an object at a predetermined position to prevent overextension of the plurality of cords.

3. The apparatus of claim 1, further comprising a plurality of diode means wherein each one of the plurality of diode means is connected to one of the plurality of sensor modules for damping out a signal generated by the connected sensor module during return of the apparatus to resting position.

4. The apparatus of claim 1, wherein the controller determines velocity at impact using a peak voltage value.

5. The apparatus of claim 1, wherein the controller determines velocity at impact using a total voltage value.

6. The apparatus of claim 1, wherein the controller determines a location of impact using a location of a sensor module generating a highest voltage along a predetermined axis.

7. The apparatus of claim 1, wherein the controller determines a location of impact using a location of a pair of sensor modules generating a highest voltage along a predetermined axis.

8. The apparatus of claim 1, wherein the controller computes statistical, graphical and analytical information.

9. The apparatus of claim 1, further including a display unit connected to receive display data from the controller.

10. The apparatus of claim 9, wherein the display unit may display analytical, statistical or graphical information.

11. The apparatus of claim 1, wherein the apparatus returns an object impacting the apparatus to a predetermined location.

12. The apparatus of claim 1 further comprising a second means for capturing an object mounted behind the means for capturing an object.

13. The apparatus of claim 12 wherein the second means for capturing an object provides trajectory information.

14. The apparatus of claim 1 wherein the means for capturing an object comprises a net.

15. The apparatus of claim 14 wherein predetermined strings of the net are attached to one of the plurality of cords.

16. The apparatus of claim 1 wherein at least one of the plurality of sensor modules comprises:
   a) an output drum rotatably attached to a sensor module and having an upper spindle, a lower spindle and an axis;
   b) a take up drum attached to the lower spindle by a spring attached at a first end to the lower spindle and having a second end wound around the take up drum, wherein the spring biases the output drum to a rest state; and
   c) a means for generating a voltage having a shaft, wherein the shaft is attached to the axis of the output drum, and the means for generating a voltage generates a voltage signal proportional to a rate of rotation.

17. The apparatus of claim 16, wherein the spring comprises a constant force spring.

18. The apparatus of claim 1, wherein the frame comprises a rectangle.

19. The apparatus of claim 18, wherein the plurality of sensor modules are attached to two perpendicular sides of the outer edge of the frame.

20. The apparatus of claim 1, wherein the frame comprises a circle.

21. The apparatus of claim 1, wherein the means for capturing an object is substantially dome shaped.

22. The apparatus of claim 1, further comprising a means for receiving an object from the means for capturing an object.

23. The apparatus of claim 1, wherein the plurality of sensor modules have a modular design for easy replacement.

24. The apparatus of claim 1 wherein at least one of the plurality of sensor modules further comprises a motor.

25. The apparatus of claim 1, wherein the controller computes a shape signature produced by an impact on the means for capturing an object to determine trajectory.

26. The apparatus of claim 1 wherein the controller comprises a digital computer.

27. The apparatus of claim 1 wherein at least one of the plurality of sensor modules further comprises a linear displacement transducer.

28. The apparatus of claim 1 wherein at least one of the plurality of sensor modules further comprises an optical encoder.

29. An apparatus for determining position and velocity of an object at impact, comprising:
 a) a frame having a plurality of holes and an outer edge;
 b) a plurality of sensor modules attached to the outer edge of the frame;
 c) a plurality of output drums, wherein at least one of the plurality of output drums is rotatably attached to a sensor module and having an upper spindle, a lower spindle and an axis;
 d) a plurality of take up drums, wherein at least one of the plurality of take up drums is attached to the lower spindle by a spring attached at a first end to the lower spindle and having a second end wound around the at least one of the plurality of take up drums, wherein the spring biases the at least one of the plurality of output drums to a rest state;
 e) a means for generating a voltage having a shaft, wherein the shaft is attached to the axis of the at least one of the plurality of output drums, and the means for generating a voltage generates a voltage signal proportional to a rate of rotation;
 f) means for capturing an object wherein the means for capturing an object is located within the frame and attached to the plurality of output drums by a plurality of cords, wherein each end of each of the plurality of cords passes through one of the plurality of holes and is wound around the at least one output drum; and
 g) a controller attached to receive voltage signals from the plurality of sensor units, whereby the controller determines a position and a velocity of impact using the voltage signals.

30. The apparatus of claim 29, wherein a stop attaches to each of the plurality of cords and provides a resting position for the apparatus at a predetermined point.

31. The apparatus of claim 29, further comprising a backing mounted behind the means for capturing an object at a predetermined position to prevent overextension of the plurality of cords.

32. The apparatus of claim 29, further comprising a diode means for damping out a signal generated by the means for generating a voltage during return of the apparatus to resting position.

33. The apparatus of claim 29, wherein the controller determines velocity at impact using a peak voltage value.

34. The apparatus of claim 29, wherein the controller determines velocity at impact using a total voltage value.

35. The apparatus of claim 29, wherein the controller determines a location of impact using a location of a sensor module generating a highest voltage along a predetermined axis.

36. The apparatus of claim 29, wherein the controller determines a location of impact using a location of a pair of sensor modules generating a highest voltage along a predetermined axis.

37. The apparatus of claim 29, wherein the controller computes statistical, graphical and analytical information.

38. The apparatus of claim 29, further including a display unit connected to receive display data from the controller.

39. The apparatus of claim 38, wherein the display unit may display analytical, statistical or graphical information.

40. The apparatus of claim 29, wherein the apparatus returns an object impacting the apparatus to a predetermined location.

41. The apparatus of claim 29 further comprising a second means for capturing an object mounted behind the means for capturing an object.

42. The apparatus of claim 41 wherein the second means for capturing an object provides trajectory information.

43. The apparatus of claim 29 wherein the means for capturing an object comprises a net.

44. The apparatus of claim 43 wherein predetermined strings of the net are attached to one of the plurality of cords.

45. The apparatus of claim 29, wherein the spring comprises a constant force spring.

46. The apparatus of claim 29, wherein the frame comprises a rectangle.

47. The apparatus of claim 46, wherein the plurality of sensor modules are attached to two perpendicular sides of the outer edge of the frame.

48. The apparatus of claim 29, wherein the frame comprises a circle.

49. The apparatus of claim 29, wherein the means for capturing an object is substantially dome shaped.

50. The apparatus of claim 29, further comprising a means for receiving an object from the means for capturing an object.

51. The apparatus of claim 29, wherein the plurality of sensor modules have a modular design for easy replacement.

52. The apparatus of claim 29, wherein the means for generating a voltage comprises a motor.

53. The apparatus of claim 29, wherein the means for generating a voltage comprises an optical encoder for generating a voltage proportional to rotation of the shaft.

54. The apparatus of claim 29, wherein the controller computes a shape signature produced by an impact on the means for capturing an object to determine trajectory.

55. A method for determining position and velocity of impact comprising the steps of:
 a) providing a target unit having a net;
 b) providing a plurality of sensors disposed along a predetermined set of axis, each of the plurality of sensors extendably attached to the net by a cord;
 c) generating a plurality of voltage signals from the plurality of sensors, wherein each one of the plurality of sensors generates a voltage signal proportional to a force directed against a portion of the net attached to a respective one of the plurality of sensors; and
 d) determining a velocity and a location from the plurality of sensors.

56. The method of claim 55 further including the step of displaying the velocity and location on a display unit.

57. The method of claim 55 further including the step of providing analytical or statistical information on more than one impact.

58. The method of claim 55 wherein a user may select a mode of operation to choose what analytical or statistical information may be provided.

59. A apparatus for determining position and velocity of an object at impact, comprising:
 a) a frame having a plurality of holes and an outer edge;
 b) a plurality of sensor modules attached to the outer edge of the frame;

c) a plurality of voltage generators having an axis, wherein one of the plurality of voltage generators is located within each of the plurality of sensor modules, and each of the plurality of voltage generators generates a voltage in proportion to rotation of the axis; and d) means for capturing an object wherein the means for capturing an object is located within the frame and attached to the plurality of sensor modules by a plurality of cords, wherein each end of each of the plurality of cords passes through one of the plurality of holes and is wound around the axis to cause rotation of the axis when capturing an object.

60. The apparatus of claim 59 further comprising a controller attached to receive voltage signals from the plurality of sensor units, whereby the controller determines a position and a velocity of impact using the voltage signals.

61. The apparatus of claim 60 wherein the controller further comprises a microprocessor.

62. The apparatus of claim 60 further comprising an LED array connected to the controller, wherein the LED array receives a display input from the controller and displays analytical, statistical or graphical information.

63. The apparatus of claim 59 further comprising a plurality of sample and hold circuits each connected to a respective one of the plurality of voltage generators to receive and capture a peak voltage.

* * * * *